US012778073B2

(12) United States Patent
Fintel

(10) Patent No.: US 12,778,073 B2
(45) Date of Patent: Nov. 3, 2026

(54) EQUINE SLOW-FEEDER FOR SIMULATING GRAZING BEHAVIOR

(71) Applicant: Sean Steven Fintel, Firth, NE (US)

(72) Inventor: Sean Steven Fintel, Firth, NE (US)

( * ) Notice: Subject to any disclaimer, the term of this patent is extended or adjusted under 35 U.S.C. 154(b) by 0 days.

(21) Appl. No.: 19/264,021

(22) Filed: Jul. 9, 2025

(65) Prior Publication Data

US 2026/0013464 A1 Jan. 15, 2026

Related U.S. Application Data

(60) Provisional application No. 63/671,391, filed on Jul. 15, 2024.

(51) Int. Cl.
*A01K 1/10* (2006.01)

(52) U.S. Cl.
CPC .................................... *A01K 1/105* (2013.01)

(58) Field of Classification Search
CPC ........ A01K 1/10; A01K 1/105; A01K 1/0209; A01K 5/0107; A01K 5/0108
See application file for complete search history.

(56) References Cited

U.S. PATENT DOCUMENTS 3,916,837 A * 11/1975 Murto .................... A01K 39/01 119/478
3,999,520 A * 12/1976 Feterl ................... A01K 5/0107 119/58
4,020,794 A 5/1977 Nethery
6,205,951 B1 * 3/2001 Sprik ..................... A01K 1/105 119/60
6,601,536 B2 * 8/2003 Sprik ..................... A01K 1/105 119/524
7,493,872 B1 * 2/2009 McCully .............. A01K 15/027 119/51.01
7,685,968 B2 * 3/2010 Cooper .................. A01K 1/105 119/515
9,374,980 B1 6/2016 Schwenke
9,497,929 B2 11/2016 Jubinville et al.
12,102,064 B1 * 10/2024 Yang .................... A01K 5/0114
12,150,432 B1 * 11/2024 Van Delden ........ A01M 31/008
2022/0287269 A1 9/2022 Duke et al.

FOREIGN PATENT DOCUMENTS

| | | | |
|---|---|---|---|
| AU | 482578 | B2 | 8/1975 |
| EP | 0930004 | A2 | 7/1999 |
| ES | 1055109 | U | 10/2003 |

(Continued)

*Primary Examiner* — Magdalena Topolski
*Assistant Examiner* — Katherine Anne Kloecker

(57) ABSTRACT

An equine slow-feeder comprises an external frame defining an internal cavity for receiving baled hay, at least one openable door for loading the hay, and a set of trolley tracks sloping downward toward the middle of the internal cavity. A feed-through grid panel, movably coupled to the trolley tracks via trolley wheel assemblies, is configured to compress the hay under its weight as it rolls inward due to gravity, exposing portions of the hay through narrow feeding spaces to regulate equine animal feeding. A low hay sensor is configured to send a notification in response to the baled hay in the internal cavity being diminished to a point requiring loading additional hay into the internal cavity within a predetermined amount of time.

19 Claims, 16 Drawing Sheets

LIVESTOCK SLOW-FEEDER 100

(56) References Cited

FOREIGN PATENT DOCUMENTS

| | | | | |
|---|---|---|---|---|
| ES | 2245574 | A1 | 1/2006 | |
| FR | 2689368 | A1 * | 10/1993 | ............... A01K 1/10 |
| FR | 3026275 | A1 | 4/2016 | |
| GB | D1054211 | A | 1/1967 | |
| GB | 2287634 | A | 9/1995 | |

* cited by examiner

LIVESTOCK SLOW-FEEDER 100

LIVESTOCK SLOW-FEEDER 100

LIVESTOCK SLOW-FEEDER 100

LIVESTOCK SLOW-FEEDER 100

LIVESTOCK SLOW-FEEDER 100

LIVESTOCK SLOW-FEEDER 100

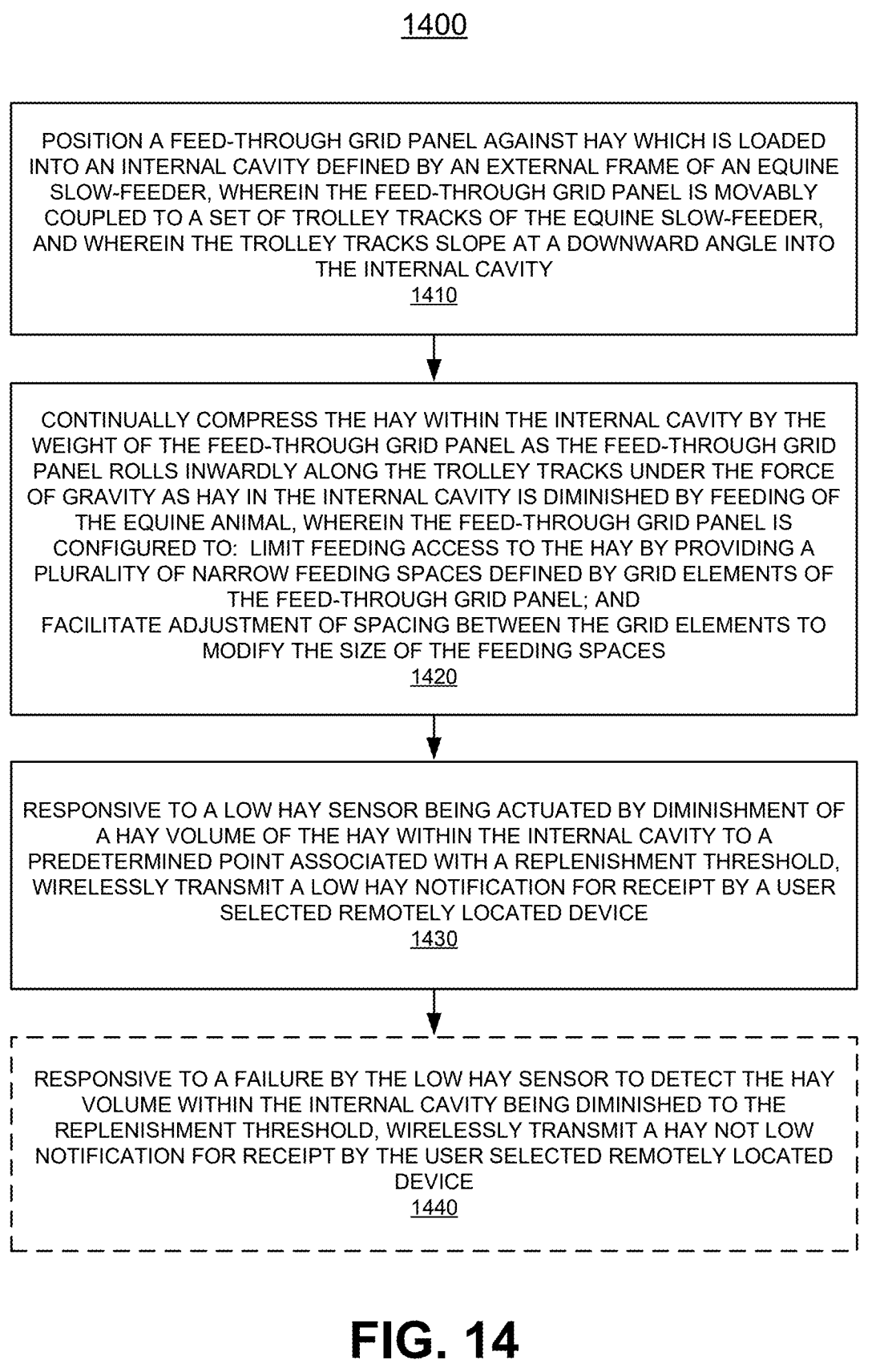

1400

POSITION A FEED-THROUGH GRID PANEL AGAINST HAY WHICH IS LOADED INTO AN INTERNAL CAVITY DEFINED BY AN EXTERNAL FRAME OF AN EQUINE SLOW-FEEDER, WHEREIN THE FEED-THROUGH GRID PANEL IS MOVABLY COUPLED TO A SET OF TROLLEY TRACKS OF THE EQUINE SLOW-FEEDER, AND WHEREIN THE TROLLEY TRACKS SLOPE AT A DOWNWARD ANGLE INTO THE INTERNAL CAVITY
1410

↓

CONTINUALLY COMPRESS THE HAY WITHIN THE INTERNAL CAVITY BY THE WEIGHT OF THE FEED-THROUGH GRID PANEL AS THE FEED-THROUGH GRID PANEL ROLLS INWARDLY ALONG THE TROLLEY TRACKS UNDER THE FORCE OF GRAVITY AS HAY IN THE INTERNAL CAVITY IS DIMINISHED BY FEEDING OF THE EQUINE ANIMAL, WHEREIN THE FEED-THROUGH GRID PANEL IS CONFIGURED TO: LIMIT FEEDING ACCESS TO THE HAY BY PROVIDING A PLURALITY OF NARROW FEEDING SPACES DEFINED BY GRID ELEMENTS OF THE FEED-THROUGH GRID PANEL; AND
FACILITATE ADJUSTMENT OF SPACING BETWEEN THE GRID ELEMENTS TO MODIFY THE SIZE OF THE FEEDING SPACES
1420

↓

RESPONSIVE TO A LOW HAY SENSOR BEING ACTUATED BY DIMINISHMENT OF A HAY VOLUME OF THE HAY WITHIN THE INTERNAL CAVITY TO A PREDETERMINED POINT ASSOCIATED WITH A REPLENISHMENT THRESHOLD, WIRELESSLY TRANSMIT A LOW HAY NOTIFICATION FOR RECEIPT BY A USER SELECTED REMOTELY LOCATED DEVICE
1430

↓

RESPONSIVE TO A FAILURE BY THE LOW HAY SENSOR TO DETECT THE HAY VOLUME WITHIN THE INTERNAL CAVITY BEING DIMINISHED TO THE REPLENISHMENT THRESHOLD, WIRELESSLY TRANSMIT A HAY NOT LOW NOTIFICATION FOR RECEIPT BY THE USER SELECTED REMOTELY LOCATED DEVICE
1440

FIG. 14

EQUINE SLOW-FEEDER FOR SIMULATING GRAZING BEHAVIOR

CROSS-REFERENCE TO RELATED APPLICATIONS

This application claims priority to and benefit of U.S. Provisional Patent Application No. 63/671,391 filed on Jul. 15, 2024, entitled "LIVESTOCK SLOW-FEEDER" by Sean Steven Fintel, the disclosure of which is hereby incorporated herein by reference in its entirety.

BACKGROUND

Many equine animals (e.g., horses, donkeys, zebras, mules, hinnies) require consistent access to forage to maintain digestive health and overall well-being. A preferred method of supporting this requirement is to allow them to graze in a pasture. Grazing is a feeding behavior in equine animals that is characterized by slow and steady feed intake that aids in proper nutritional assimilation. The slow speed of grazing also naturally helps prevent overeating by an equine animal, as it is difficult for an animal to eat fast enough to overeat. However, when pasture access to fresh forage is limited or unavailable, supplemental feeding with hay is commonly employed.

Hay is typically preserved in the form of bales. There are numerous varieties of hay forage crops that may be conserved, such as by baling, for later feeding to equine animals. Hay forage crops are sometimes broadly categorized as warm and cool season grasses. Some non-limiting examples of hay forage crops that may be baled and fed to horses and other equine animals, include: alfalfa, clover, bromegrass, ryegrass, small grain grass/stubble (e.g., oat hay, barley hay, triticale hay, wheat hay, etc.), timothy, fescue, orchardgrass, bermudagrass, bluestem, gamagrass, and switchgrass.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 9B-1 and 9B-2 illustrate side detail views of a portion of the adjustable grid element holder of FIG. 9A and depict operation of the faceplate of the bracket holder which is movable to facilitate adjustment of the spacing between grid elements, in accordance with various embodiments.

FIG. 14 illustrates a flow diagram of an example method of slow-feeding an equine animal in accordance with various embodiments.

DETAILED DESCRIPTION

Figure 1:
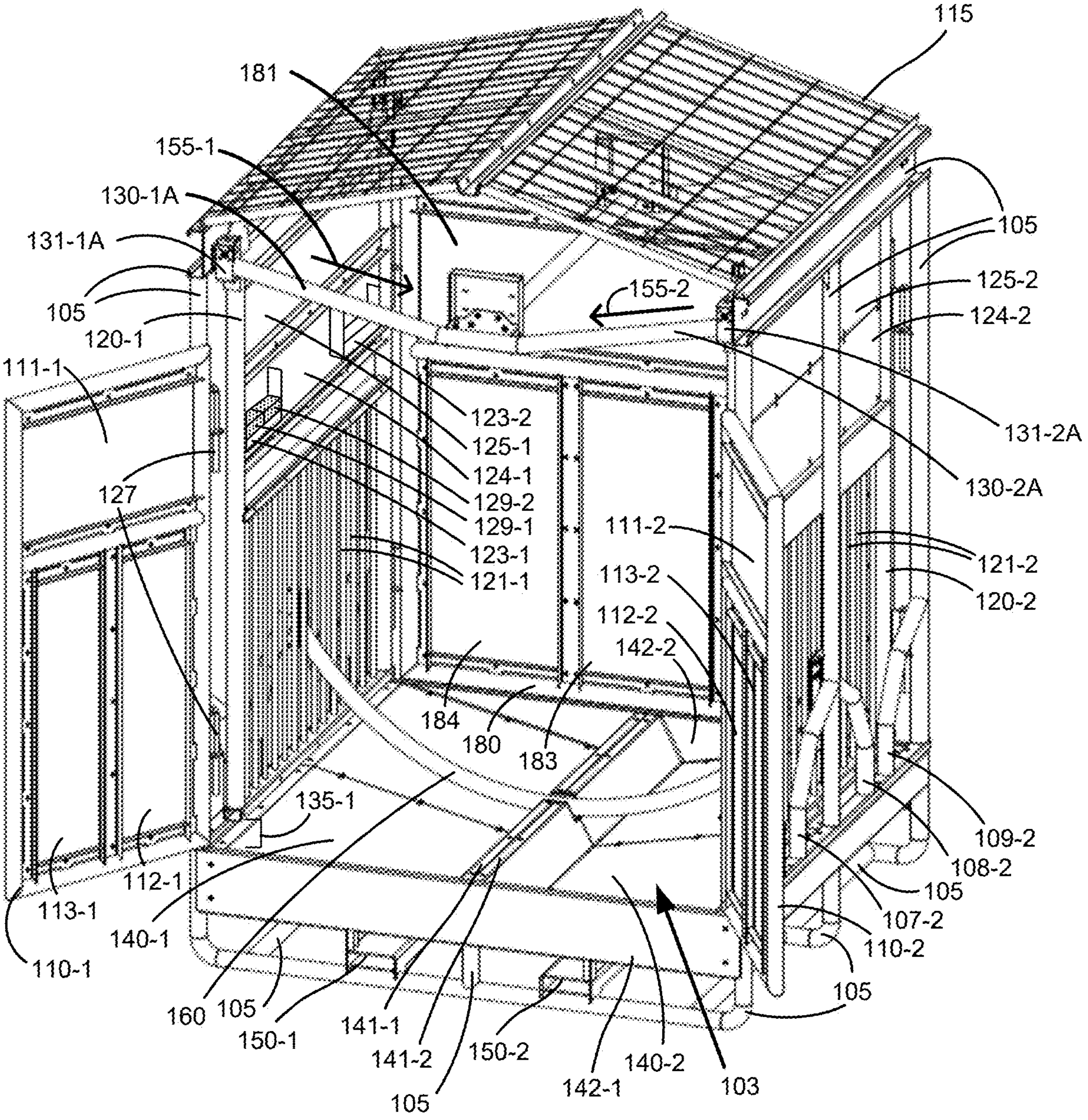
FIG. 1 depicts an upper right and rear perspective view of an equine slow-feeder with opened loading doors and in an unloaded state with no hay yet loaded inside, according to various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well-known methods, procedures, components, and circuits have not been described in detail as not to unnecessarily obscure aspects of the described embodiments.

Overview of Discussion

When reliable pasture access for equine animals is limited, supplemental feeding with hay is commonly employed. However, simply providing hay for equine consumption often falls short of replicating the nuances of natural grazing and can lead to challenges such as inefficient feed utilization, overeating, and potential digestive stress. A slow-feeder system is described herein which better simulates continuous, natural forage consumption while addressing the practical limitations of managed feeding environments.

Grazing by a horse or other equine animal is a slow and deliberate eating process, whereas many conventional livestock an equine feeders provide such easy access to hay that they are more like allowing an animal to eat at an unlimited buffet. Such easy access to abundant food provided by conventional livestock and equine feeders can facilitate equine animals overeating and thus contribute to ailments like colic. The equine slow-feeder described herein provides a more natural feeding solution than conventional livestock/equine feeders by adding a small (and in some embodiments adjustable) amount of difficulty to feeding on hay which is loaded into the slow-feeder in order to simulate the difficulty of pulling and tearing loose vegetative matter that takes place when an equine animal is naturally grazing in a field. This increased difficulty is promoted by at least two aspects of the described slow-feeder: 1) by continually and consistently compressing the hay with rolling feed-through panels (which may be adjustably weighted) as feeding diminishes the amount of hay in the slow-feeder; and 2) by providing only small gaps (which may be adjustably sized) through which the equine animal(s) can grasp and pull out the compressed hay with their mouth parts. These aspects of added, and in some embodiments adjustable, difficulty in access to the hay in the described equine slow-feeder act to slow down the feeding of an equine animal, which is in contrast to typical conventional feeders which may offer unrestricted access to hay, inconsistent restriction to the ease of hay access, and/or provide no adjustability to the ease of hay access.

Slowing feeding in the manner facilitated by the slow-feeder described herein simulates the natural equine grazing behavior of slowly biting and pulling while eating. The elements of restricted access provided by the equine slow-feeder described herein improve an equine animal's health and well-being by preventing fast-eating and overeating which can cause digestion problems like colic. The elements of restricted access provided by the equine slow-feeder also cause a volume of hay (e.g., a large round bale) to last longer than it would during free-feeding. This is in part because feeding action is slowed, thus giving an animal added time for its fullness response to signal to the animal that it should stop eating before overeating has occurred. The restricted access and continual, consistent compression of loaded hay also prevent/diminish breakdown of a bale, as frequently occurs in conventional unrestricted access bale feeders. Such bale breakdown in unrestricted/inconsistently restricted access bale feeders often causes hay to become scattered and/or trod through, and in some cases spoiled. These problems are reduced or eliminated by the equine slow-feeder described herein, thus reducing hay waste and saving money. Moreover, unlike many existing feeders, the disclosed equine slow-feeder ensures horses and other equine animals feed in a natural posture that reduces health risks such as colic, ulcers, digestion issues, and respiratory issues. Further, the ability to adjust one or more of the compression of the hay and the spacings through which hay is accessed allow for varying the difficulty of access based on factors such as medical conditions, dietary requirements, the type of hay being fed, how tightly the hay is baled, etc.

Discussion begins with an overall description the equine slow-feeder and then proceeds to discuss various components, such as its rolling weighted compression system and adjustable feed through grid elements in more detail along with a variety of views of the equine slow-feeder. Discussion continues with description of the adjustable nature of the feed-through grid panels to include adjustable spacing of grid elements and adjustable weight of the feed-through grid panel. Techniques for identifying a low hay situation and providing a low hay notification are described. Finally, the elements of the slow-feeder are described in connection with an example method of slow-feeding an equine animal.

Example Equine Slow-Feeder

FIGS. 1-8 depict views of an equine slow-feeder 100 (generally referred to herein as "slow-feeder" 100), according to various embodiments. For simplicity of discussion, the feed disposed in an equine slow-feeder 100 is often referred to generically as "hay," but it should be understood that the feed disposed in equine slow-feeder 100 may be any of numerous types of hay which are suitable for equine consumption.

With reference generally to FIGS. 1-8, equine slow-feeder 100 comprises: an external frame 105 which defines an internal cavity 103; one or more openable side doors 110 (e.g., 110-1, 110-2) through which hay 205 (first shown in FIG. 2) can be loaded into the interior/internal cavity 103; a set of inwardly downward sloped trolley tracks 130 (e.g., 130-1A, 130-1B, 130-2A, 130-2B) coupled with the external frame 105; and at least one feed-through grid panel 120 (e.g., 120-1 and/or 120-2) which is movably coupled to a set of trolley tracks 130 by trolley wheel assembly 131 (e.g., 131-1A, 131-1B, 131-2A, and 130-2B). In some embodiments, the equine slow-feeder 100 may additionally comprise one or more troughs 140 (e.g., 140-1 and/or 140-2); and/or one or more low hay sensors 145; a roof 115; and/or one or more fork pockets 150 (e.g., 150-1, 150-2). In some embodiments, one or more hay support elements 160 may be included to support loaded hay 205 such that a bale (e.g., a large round bale) is supported off of the ground or off of the upper surface of a trough 140. In some embodiments, additional frame elements (e.g., 106, 107, 108, 109) may be included to form one or more feeding stalls 170. Although depicted as facilitating two-sided feeding, it should be appreciated that in some embodiments, slow-feeder 100 may be set up to permit only one-sided feeding.

In general, the interior cavity 103 of equine slow-feeder 100 is configured for bulk loading of baled hay that is being slow-fed to equine animals such as a horse or horses. Typically, hay is in bale form (e.g., one or more bales can be bulk loaded into cavity 103 using a tractor, front-end loader, or the like). A variety of bale sizes can be accommodated in the interior of the slow-feeder 100—from large rectangular bales (e.g., 3 feet by 4 feet by 8 feet, etc.) and large round bales (e.g., 6 feet in diameter by 5 feet wide, 5 feet in diameter by 4 feet wide, etc.) to smaller rectangular bales (e.g., rectangular bales which may be approximately 1.5 by 3 feet by 14 inches or of smaller dimensions). In some embodiments, the slow-feeder 100 described herein may also be sized for use of bales of particular dimensions and/or shapes.

Referring now to the figures individually, FIG. 1 depicts an upper right and rear perspective view of an equine slow-feeder 100 with opened loading doors (110-1 and 110-2) and in an unloaded state with no hay yet loaded inside, according to various embodiments. An external frame 105 is shown which encompasses and defines an internal cavity 103 into which hay may be loaded for equine consumption. As illustrated, most of the elements of frame 105 are round tubular metal (e.g., steel), but other types and/or of shapes of material may be utilized.

A pair of doors 110-1 and 110-2 are coupled to opposite side edges of frame 105 by hinges 127 such that the doors meet together, like saloon doors, at approximately the midline of the right side of slow-feeder 100. It should be appreciated that other door configurations may be utilized, such as a single door hinged on one side edge, a door which is hinged on the top edge rather than on a side edge, and/or a door which is hinged on the bottom edge rather than on a side edge. When both doors 110-1 and 110-2 are in an open state, as depicted in FIG. 1, there is easy access to load baled hay into the open internal cavity 103 which is defined by external frame 105. Doors 110 may be solid or covered with material such that equine animals are prevented from feeding through doors 110. As depicted, for example, door 110-1 includes solid sub-panels 111-1, 112-1, and 113-1 which prevent feeding access. Similarly, door 110-2 includes solid sub-panels 111-2, 112-2, and 113-2 which prevent feeding access. One or more latches or locks may be provided to secure doors 110-1 and 110-2 in the open position or in a closed position.

Above the doors 110, and two sets of inwardly downward sloped trolley tracks 130 (e.g., first set 130-1A and 130-1B; and second set 130-2A and 130-2B) coupled with the external frame 105 and configured to slope downward from the outer edges toward the middle of slow-feeder 100. The angle of downward slope may be between 5 degrees and 50 degrees from horizontal, in various embodiments. In some embodiments, the angle of downward slope is between about 15 degrees and 30 degrees from horizontal. In some embodiments, the angle of downward slope is between about 20 degrees and 35 degrees from horizontal. As depicted, the trolley tracks 130 are round tubular metal similar to or the same as frame 105 and function in a secondary capacity to add additional structural stability to frame 105 by connecting the top of the front of frame 105 to the top of the rear of frame 105. The trolley tracks 130 are configured to interface with caged rollers/wheels of their associated trolley wheel assemblies 131 which are fixedly coupled to the grid panels 120. For example, trolley wheel assemblies 131-1A and 131-1B are coupled to each of the two top corner edges of grid panel 120-1 to facilitate grid panel 120-1 rolling downhill in direction 155-1 on trolley tracks 130-1A and 130-1B. Similarly, trolley wheel assemblies 131-2A and 131-2B are coupled to each of the two top corner edges of grid panel 120-2 to facilitate grid panel 120-2 rolling downhill in direction 155-2 on trolley tracks 130-2A and 130-2B. Although two track/trolley combinations are illustrated as being coupled with each grid panel, in some embodiments, a single track/trolley combination may be utilized (such as on a midline), or more than two may be utilized (such as one on each upper corner and one on the upper middle of a grid panel 120).

Two feed-through "grid panels" 120 (e.g., 120-1 and/or 120-2) are depicted, with one each on opposite ends of slow-feeder 100 such that hay 205 is loaded between them and then continually compressed between them by the force of gravity causing each grid panel 120 to press against hay 205 and roll inwardly toward the midline of slow-feeder 100 on the trolley tracks 130 to which each grid panel 120 is movably coupled by its respective trolley wheel assembly/assemblies 131. Because of the fixed downward and inward slope angle of the trolley tracks 130, the compressive force exerted on the hay by the feed-through grid panels 120 remains consistent and substantially constant as the feed-through grid panels 120 roll downward and inward on the trolley tracks 130 in response to hay being diminished by equine consumption. As depicted, the top portion (approximately the top half) of each grid panel 120 is occluded by solid sub-panels (124-1 and 125-1 in panel 120-1; and 124-2 and 125-2 in panel 120-2) to prevent an animal from feeding through the top of the grid panel. In some embodiments, one or more of these solid sub-panels 124 and 125 in each grid panel 120 may be adjustable or removed completely for larger animals or larger/differently shaped bale types. If removed, the removed sub-panel may be left open or replaced with grid material similar or the same as used in the bottom portion of grid panel 120, or the grid material from the bottom portion of grid panel 120 may be extended upwards. The ability to remove/alter the sub-panels 124 and 125 in the top portion of a grid panel 120 provides also facilitates adjustability for different sizes of bales and for weathered bales which, due to age or prior exposure to elements, have a non-uniform shape and/or do not flow as well within the slow-feeder 100 during consumption by equine animals as would a newer, less weathered, or more uniformly shaped bale 205.

The bottom portion (again, approximately the bottom half) of each grid panel 120 has spaced apart grid elements 121 (e.g., 121-1 in panel 120-1 and 121-2 in panel 120-2) composed of wire, metal bars, pipes, tubing, nylon filament, nylon strapping, Kevlar strapping, or other suitable grid material. Although only vertical parallel grid elements are shown, other arrangements such as horizontal grid elements 121 or crossing grid elements 121 may be employed. Additionally, in some elements, the horizontal spacing between vertical grid elements 121 may purposefully be non-uniform. The grid elements 121 may be of any suitable shape and separation that is suitable to both compress the surface of baled hay 205 and to also expose just enough access to strands of hay in the baled hay such that the lips, tongue, and/or teeth of a horse 200 or other equine animal can grasp strands of the hay 205 and pull them free, with some effort, while feeding.

In some embodiments, half-inch metal tubing may be used for grid elements 121 and may be spaced on centers of between 1.5 inch and 10 inches (e.g., 2.75 inches on center), in various embodiments, to provide adjustments for hay availability per bite. In some embodiments, the vertical grid elements 121 may be replaced by a nylon grid (see FIG. 10) which has openings through which hay may be consumed by an animal, where the size of the grid openings may be fixed but the fixed size regulates the hay ability per bite. Such a grid may have openings that are sized anywhere between 0.5 inches square (or 0.5 inches diameter if the shape is not square) up to 7 inches square (or 7 inches in diameter if the shape is not square). For example, a nylon grid may have square openings that are 1.75 inches by 1.75 inches. The size of the openings in a nylon grid may be selected to be larger within this range to increase feed availability or smaller within this range to decrease feed availability. It should be appreciated that, in some embodiments, the openings/spacings of grid elements may not be regular (e.g., 3 inches between a first set of grid elements and 2 inches between another second set of grid elements) and may not be uniform in dimension (e.g., an opening may be an elongated rectangle, a triangle, a parallelogram, or some shape other than a square).

In some embodiments, the grid panel 120, grid elements 121, or the portion of a grid panel 120 which includes the grid elements 121 may be replaced to allow for adjustment of the spacing and/or shapes of openings between grid elements 121. Thus, the spacing between grid elements may be decreased to make simulated grazing more difficult or increased to make simulated grazing less difficult. This facilitates configuring a grid panel 120 to simulate different grazing conditions; configuring a grid panel 120 for use by different types of equine animals (e.g., donkeys, horses, ponies, zebras, mules, hinnies wild asses, zorses) which graze in differing manners; and or configuring a grid panel 120 for varying ages (young, adult, geriatric), varying health levels, varying animal sizes, and or varying diets. For example, larger spacing between grid elements 121 may be employed for zebra than for horses or for draft horses than for quarter horses. Similarly, small grid spacing may be employed for a colt, medium grid spacing may be employed for an adult horse, and large grid spacing may be employed for a geriatric horse. Likewise, a smaller spacing may be employed for a healthy animal and a larger spacing may be employed for a sick animal which is not at full strength. In a like manner, grid spacing for an animal on a restricted diet (i.e., such as to lose weight or because of a health condition) may be restricted compared to grid spacing employed for an animal of the same type which is not on a restricted diet. In other embodiments, spacing between grid elements 121 may be altered for factors such as the type of hay being fed and/or how tightly the hay is baled.

The grid panel(s) 120 are designed and configured to press against hay 205 in response to gravity causing the grid panel(s) 120 to roll downhill and compress portions of the baled hay 205 which are retained behind grid panel(s) 120. The compressive pressure of the grid panels 120 against the baled hay 205 also causes the equine animal(s) to have to exert more effort to pull strands of hay from the baled hay 205 than would be required to eat loose hay or else are required to bite off portions of hay rather than pull it free. This extra required effort helps replicate the effort and level of difficulty required to bite or pull hay from pasture ground while grazing. This compressive pressure, combined with the narrow spaces between grid elements 121, prevents a horse from quickly consuming the hay 205 and becoming ill and also provides a self-metering effect which slows feeding compared to eating directly from a bale that is not held in compression and/or behind limited access feeding spaces—which results in the baled hay held in the described slow-feeder 100 lasting for a longer period of time than if it were loose/looser and easier for the horse 200 to access and consume.

In some embodiments, grid panels 120-1 and 120-2 may be temporarily latched, chained, or otherwise secured to frame 105 in the fully spread apart orientation that is illustrated in FIG. 1 to facilitate loading hay 205 into hay receiving cavity 103 without concern about the grid panels 120 rolling inward during loading. After loading hay 205, the grid panels 120 can be unsecured and allowed to roll down and inward to compress against the loaded hay 205. In various embodiments, the weight of a grid panel 120 may scale up or down depending on the size of the grid panel 120. In one example of the depicted embodiment, which holds a large round bale, the weight of a grid panel 120, such as grid panel 120-1, without adding weights to the weight-holder 123, is between 200 and 220 pounds, but may go up or down depending on how the grid panel 120 is configured. In various embodiments, the weight of a panel may be between 150 and 300 pounds.

In some embodiments, one or more of the grid panels 120 may have a weight-holder 123 (e.g., 123-1, 123-2) which is either weighted itself (such as by being made from heavy gage metal) or, as illustrated in FIG. 1, is formed in a channel, bracket, slot, pocket, or other container which is shaped to receive, hold, and secure a one or more weighty items such as commercially standard size cinder blocks (e.g., solid cinder blocks with dimensions of 4 inches by 8 inches by 16 inches or 2 inches by 8 inches by 16 inches) or commercially standard size concrete paver blocks (e.g., solid concrete paver blocks with dimensions of 15.5 inches by 15.5 inches by 2 inches) which can be slid into the holding pocket/bracket provided by weight-holder 123. In the depicted embodiment shown in FIG. 1, a pair of concrete blocks are used as weights 129 (129-1, 129-2) in weight-holder 123-1, which is nearest to opened door 110-1. Two more concrete blocks can similarly be added to weight-holder 123-2 which is furthest from opened door 110-1. Typically, a similar amount of weight would be added to each weight-holder 123 for balance, but in FIG. 1 for illustration purposes one weight-holder 123 (123-1) is shown with weights installed while the other weight-holder 123 (123-2) is shown empty.

It should be appreciated that a variety of weighted items such as cinder/concrete blocks, paver blocks, and/or metal bars/blocks can be secured to a weight-holder 123 to increase the mass of the feed-through grid panel 120 and thus increase the force with which it compresses against hay 205 as it rolls inwardly downhill on its respective trolley tracks 130. For example, in one embodiment, weight-holders 123-1 and 123-2 are sized to hold 4-inch by 8-inch by 16-inch solid concrete blocks. By installing two 4-inch by 8-inch by 16-inch solid concrete blocks into each of weight-holder 123-1 and 123-2 about 130 pounds of weight can be added to grid panel 120-1. For example, the weight of feed-through grid panel 120-1 could be increased from about 210 pounds to about 340 by adding two cinder blocks to weight-holder 123-1 and another two cinder blocks to weight-holder 123-2. In this manner, adding weight to a grid panel 120 increases the compressive force it exerts against hay 205 dispose inside of slow-feeder 100 and thus makes feeding more difficult and slower in comparison to not increasing the mass of the grid panel 120.

In various embodiments, the weight-holder(s) 123 of a grid panel 120 facilitate(s) a user-configurable amount mass to be employed for adjusting the compressive force of the grid panel 120 against the hay (e.g., baled hay 205) in the receiving cavity 103. In some embodiments, a user may increase or decrease the configurable mass of the grid panel based upon factors such as: the type of hay being fed (e.g., less or no added mass for alfalfa, a medium amount of added mass for triticale, and a large amounted of added mass for timothy hay); how tightly the hay is baled (e.g., less or no added mass for tightly baled hay, and more added mass for loosely baled hay); the type of animal feeding at the slow-feeder 100 (e.g., less mass may be added for a donkey than for a full size young adult horse); the age of the animal feeding at the slow-feeder 100 (e.g., less mass may be added for a young adult horse than for a geriatric horse); and/or the health of the animal (e.g., less mass may be added for a sick horse than for a healthy horse); and/or for dietary purposes (e.g., less or no mass may be added for a horse with no dietary restrictions and more mass may be added for a horse which is on a calorically restricted diet).

It follows that the combination of user-configurable mass of a grid panel 120 and user-configurable spacing of grid elements 121 (or openings in a feed-through grid) in a grid panel 120 facilitate a large amount of configuration of slow-feeder for: different sizes of equine animals; different types of equine animals; different health conditions of animals; different ages of equine animals; different caloric needs of equine animals; different grazing conditions being simulated; different hay type being fed; and differing tightness of the baling between bales of hay being fed. For example, a user may increase the hay compressing mass by adding two solid concrete blocks (e.g., 129-1 & 129-2) to the weight-holder 123-1 of grid panel 120-1 and utilizing grid elements 121-1 with a spacing which gives a 1.75-inch opening 122-1 between adjacent grid elements 121-1 to establish a first feed rate governed by a combination of the compressive force exerted by the grid panel 120-1 and spacing of the grid elements 121-1. A second and faster feed rate for the same animal may be established, for example, by removing one or both of the concrete blocks (129-1 and/or 129-2) from the weight-holder 123-1 of the feed-though grid panel 120-1, increasing spacing of adjacent grid elements 121-1 to provide openings 122-1 of 3.5 inches, or both.

In some embodiments, when included, trough(s) 140 (e.g., 140-1 and/or 140-2) are coupled to the external frame 105, forming a bottom boundary of the internal cavity 103, and is/are configured to catch/capture and hold stray hay/dislodged hay which falls from baled hay 205 during feeding such that the falling hay does not land on the ground beneath the slow-feeder to be trampled and/or spoiled, but instead is still easily accessible to the equine animal such that it may be eaten by the equine animal reaching through the grid panel 120 to retrieve the hay from the surface of a trough 140. In this manner, spoilage and waste are reduced as compared to feeders which permit stray/dislodge hay to fall on the ground and/or into areas which are inaccessible to the feeding equine animal. In some such embodiments, one or more holes (not depicted) may be disposed in the bottom of trough(s) 140 to prevent retention of water (such as from rain).

In some embodiments, as depicted, the trough(s) 140 are angled downward from the left and/or right sides of the slow-feeder 100 toward the middle of the slow-feeder 100. In some embodiments the angle of downward slope is similar to or the same as the downward slope of the inwardly downward sloped trolley tracks 130, such that as a grid panel 120 above a trough 140 rolls inwardly due to gravity as the hay 205 is diminished through feeding, the bottom edge of the grid panel 120 maintains substantially the same distance of separation from the upper surface of the trough 140 throughout its inward travel. The similar or matching downhill slopes between a trough 140 and the trolley tracks 130 vertically above the trough 140 further facilitates slow-feeding by keeping a fixed or substantially fixed, small gap (135-1 visible in FIG. 1; 135-2 visible in FIG. 2) of between about 1 inch and 4 inches the bottom edge of grid panel 120 and the top surface of trough 140. In some embodiments the fixed/substantially fixed gap 135-1 is between 2.5 inches and 3.5 inches, with a target gap of about 3 inches. By "substantially fixed" what is meant is that there could be some variation in the size of the gap 135 of up to about 1.5 inches when grid panel 120 is not completely vertical or due to a slight mismatch between the slope of a trough 140 and its vertically corresponding trolley tracks 130. Because the fixed/substantially fixed gap 135 does not widen at all or does not widen much as grid panel 120 moves inward during consumption of hay bale 205, this prevents more hay being available in the trough 140 and also prevents an equine animal from getting increasing access to a contained bale 205 from a large or increasingly large gap 135 beneath the grid panel 120 and a trough 140 as the grid panel 120 moves inward. This also helps maintain the volume of hay bale 205 that is kept behind a grid panel 120 as the grid panel 120 moves inward, by not allowing hay to easily spread from the bottom of the bale 205 and through a large or increasing gap 135 between the grid panel 120 and the trough 140. As depicted, hay trough 140-1 has a downhill slope from left to right until a midline stop 141-1 is reached, while hay trough 140-2 has a downhill slope from right to left until a midline stop 141-2 is reached. The stop mechanisms (midline stops 141-1 and 141-2) prevent the bottom edge of the feed-through grid panels 120 from moving beyond a predetermined position). In some embodiments, the position of midline stops 141-1 and 141-2 is fixed, while in others it is user adjustable. In some embodiments, where the troughs 141-1 and 141-2 are separate elements, each may be coupled to frame 105 and then the midline stops 141-1 and 141-2 abutted against one another such that the troughs 140-1 and 140-2 are mirror images of one another. It should be appreciated that the depicted set of troughs 140-1 and 140-2 may alternatively be formed of a single sheet of material and/or of a plurality of assembled pieces of material. As depicted, side sills 142-1 and 142-2 may be mounted to frame 105 to form right and left sides, respectively, of the troughs 140. For example, side sill 142-1 forms the right side of troughs 140-1 and 140-2, while side sill 142-2 forms the left side of troughs 140-1 and 140-2.

In some embodiments, the angle of slope of a trough 140 may be user adjustable between outwardly sloped to horizontal (flat) to inwardly sloped. In some embodiments, the trough 140 is horizontal and the gap between the bottom of grid panel 120 and a trough 140 decreases as the grid panel rolls inward. In horizontal or outwardly sloped embodiments of trough 140 benefits of maintaining a small gap between the bottom of a grid panel 120 and the trough 140 are traded for increased clearance to reduce pile-up or congestion of hay between a trough 140 and the bottom edge of a grid panel 120 above it.

In some embodiments, the slow-feeder 100 may additionally include an openable or removable roof 115 which may be coupled to external frame 105. As depicted, the roof 115 is fence paneling or wire, which has openings. In other embodiments, roof 115 may be solid such as wood or sheet metal, or the wire roof 115 may be covered with a waterproof material such as plastic sheeting, weatherproof vinyl material, a weatherproof tarpaulin, or other suitable material. In some embodiments, a combination of materials may be used such as plywood which is then covered by a tarpaulin. Typically, a weatherproof material is utilized which is thick enough or capable of being secured well enough to prevent any flapping due to wind, as such flapping could spook an animal such as a horse and thus deter access to the slow-feeder 100. In some embodiments, the weatherproof material is UV resistant in addition to being waterproof. In some embodiments, roof 115 may be removed, while in other embodiments roof 115 is designed to be fixedly coupled with external frame 105 and not typically removed.

In some embodiments, slow-feeder 100 may additionally include a pair of fork pockets 150 (e.g., fork pockets 150-1 and 150-2) which are coupled with external frame 105 and which are configured to receive a pair of load lifting forks from a front-end loader, forklift, pallet jack, or the like. Thus, inclusion of fork pockets 150 facilitates the ability to safely lift and/or move slow-feeder 100 with such machines. The fork pockets 150 are depicted at the bottom of slow-feeder 100, below doors 110, but may be located in any suitable position including on the same side as a grid panel 120 and on the top of frame 105 rather than beneath it.

One or more hay support elements 160, when included may be provided near the bottom of the internal cavity 103 formed by frame 105 and may couple with two or more sides of the frame 105. As depicted, hay support element 160 is arc shaped which provides support in particular to a large round hay bale 205 and may match the general arc of the circumference of a large round bale which frequently has a circular cross-section with about a 6-foot diameter. Although only one hay support element 160 is illustrated, a plurality may be employed. In other embodiments, where slow-feeder is designed to work with square or rectangular bales, hay support element 160 may be a straight, with no arc.

The opposite side of equine slow-feeder 100, from doors 110, may include a similar set of doors or a solid panel. As depicted, a solid panel 180 is mounted to frame 105 such as by knuckle and pin connectors. Like doors 110, panel 180 may be made of a solid material or include solid sub-panels (e.g., 181, 182, 183, and 184) which prevent feed-through access by equine animals.

Figure 2:
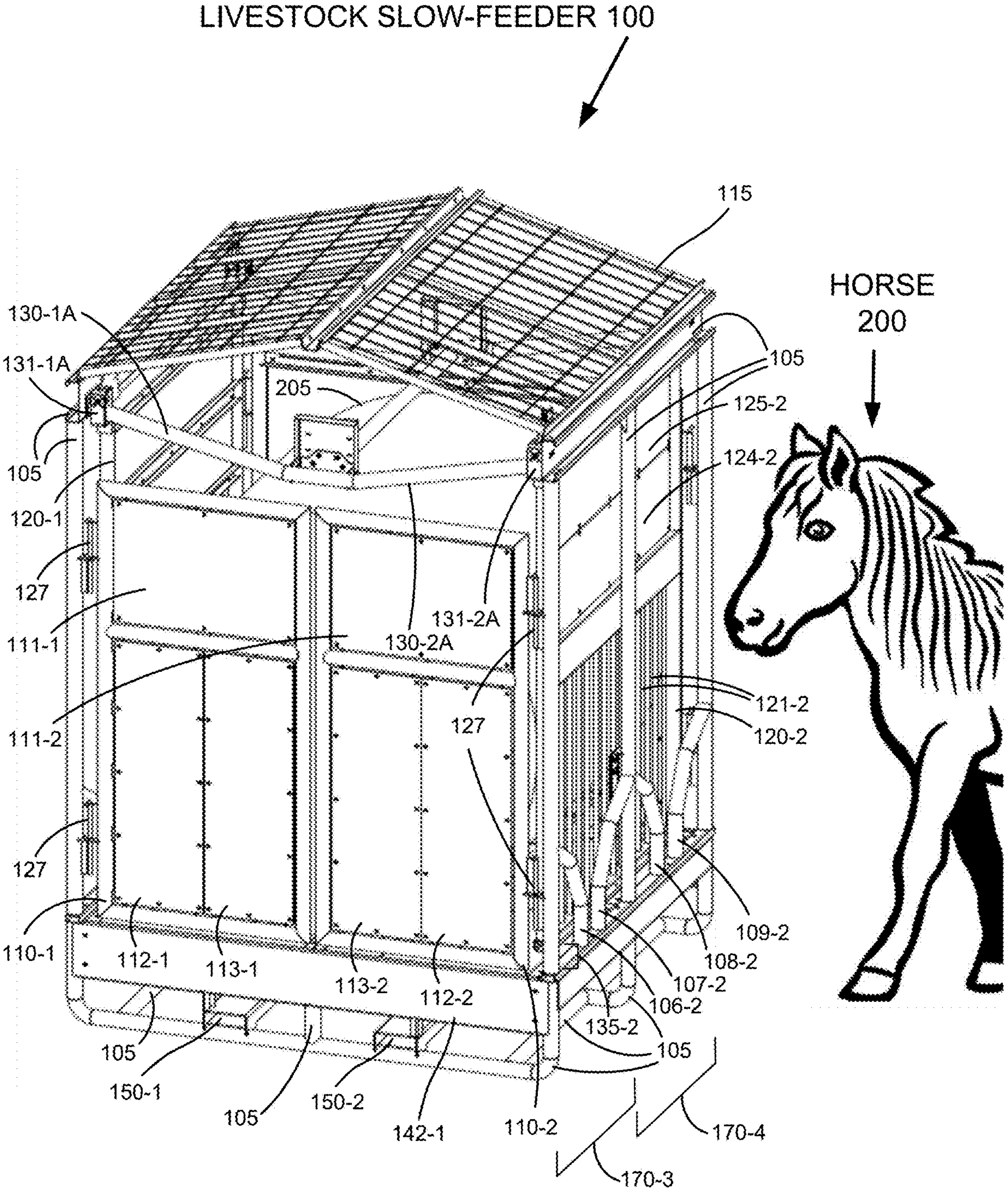
FIG. 2 depicts an upper right and rear perspective view of the equine slow-feeder of FIG. 1 with closed loading doors and in a fully loaded state with baled hay loaded inside and a horse which is about to begin feeding, according to various embodiments.

FIG. 2 depicts an upper right and rear perspective view of the equine slow-feeder 100 of FIG. 1 with closed loading doors 110-1 and 110-2 and in a fully loaded state with baled hay 205 (a large round bale) loaded inside and a horse 200 which is about to begin feeding, according to various embodiments. FIG. 2 more fully depicts additional frame elements 106-2, 107-2, 108-2, and 109-2 which have been included to form feeding stalls 170-3 and 170-4. For example, additional frame elements 106-2, 107-2 are arc shaped or in the shape of a segmented arc and couple with adjacent vertical elements of frame 105 to form the shape of feeding stall 170-3. Similarly, additional frame elements 108-2, 109-2 are arc shaped or in the shape of a segmented arc and couple with adjacent vertical elements of frame 105 to form the shape of feeding stall 170-4.

Figure 3:
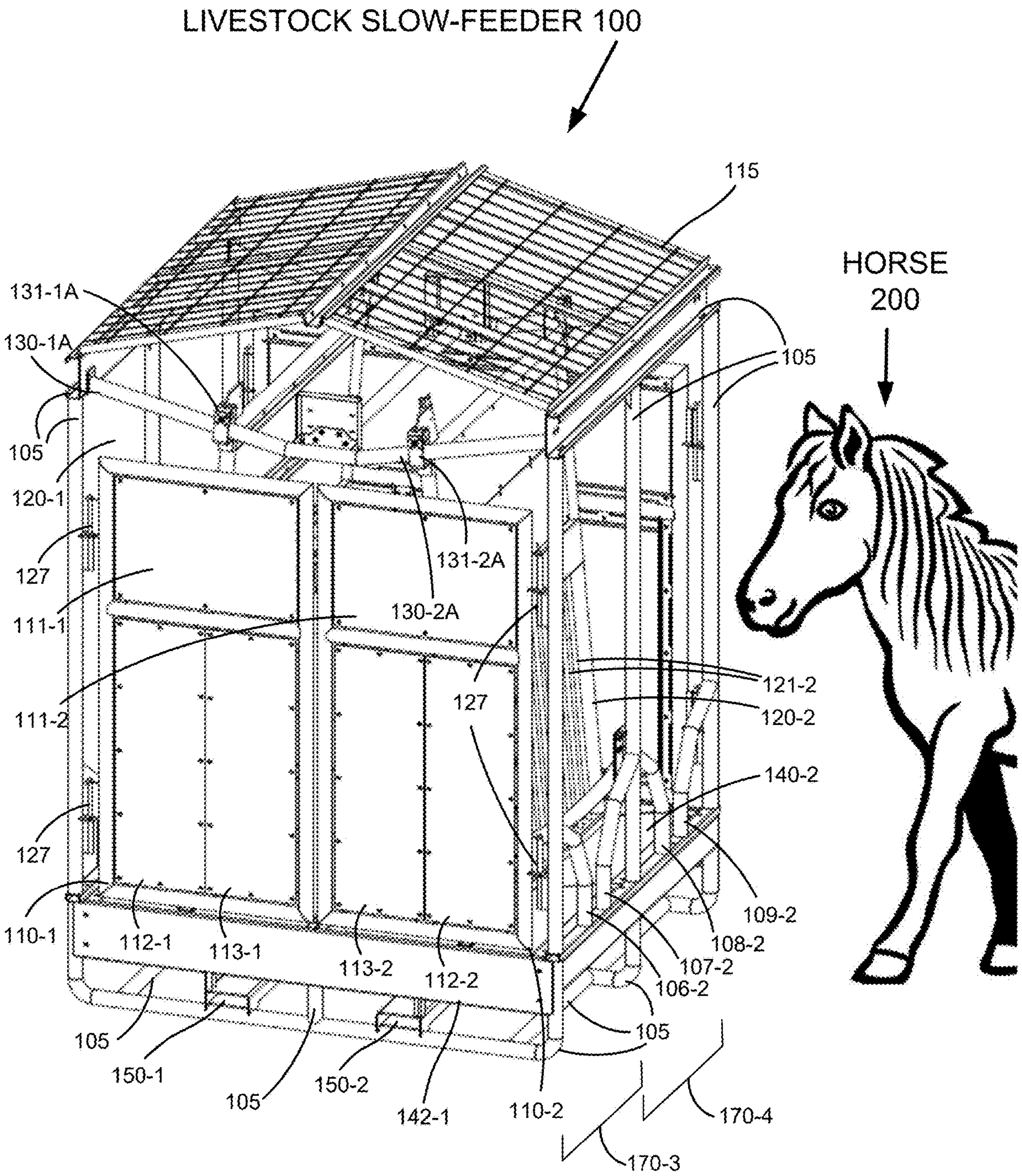
FIG. 3 depicts an upper right and rear perspective view of the equine slow-feeder of FIG. 1 with closed loading doors and in a partially loaded state with baled hay loaded inside, but which has been fed on by horse for long enough that the grid panels have traveled inward to continually compress the hay as it has been diminished by the feeding of horse, according to various embodiments.

FIG. 3 depicts an upper right and rear perspective view of the equine slow-feeder 100 of FIG. 1 with closed loading doors 110-1 and 110-2 and in a partially loaded state with baled hay 205 loaded inside, but which has been fed on by horse 200 for long enough that the grid panels 120-1 and 120-2 have traveled inward on their respective trolley tracks 130 to continually compress the hay as it has been diminished by the feeding of horse 200, according to various embodiments. Due to the inward movement of the grid panels 120, a portion of trough 140-2 is visible between grid panel 120-2 and frame 105 and is accessible for horse 200 to feed upon any loose hay which has been collected thereupon.

Figure 4:
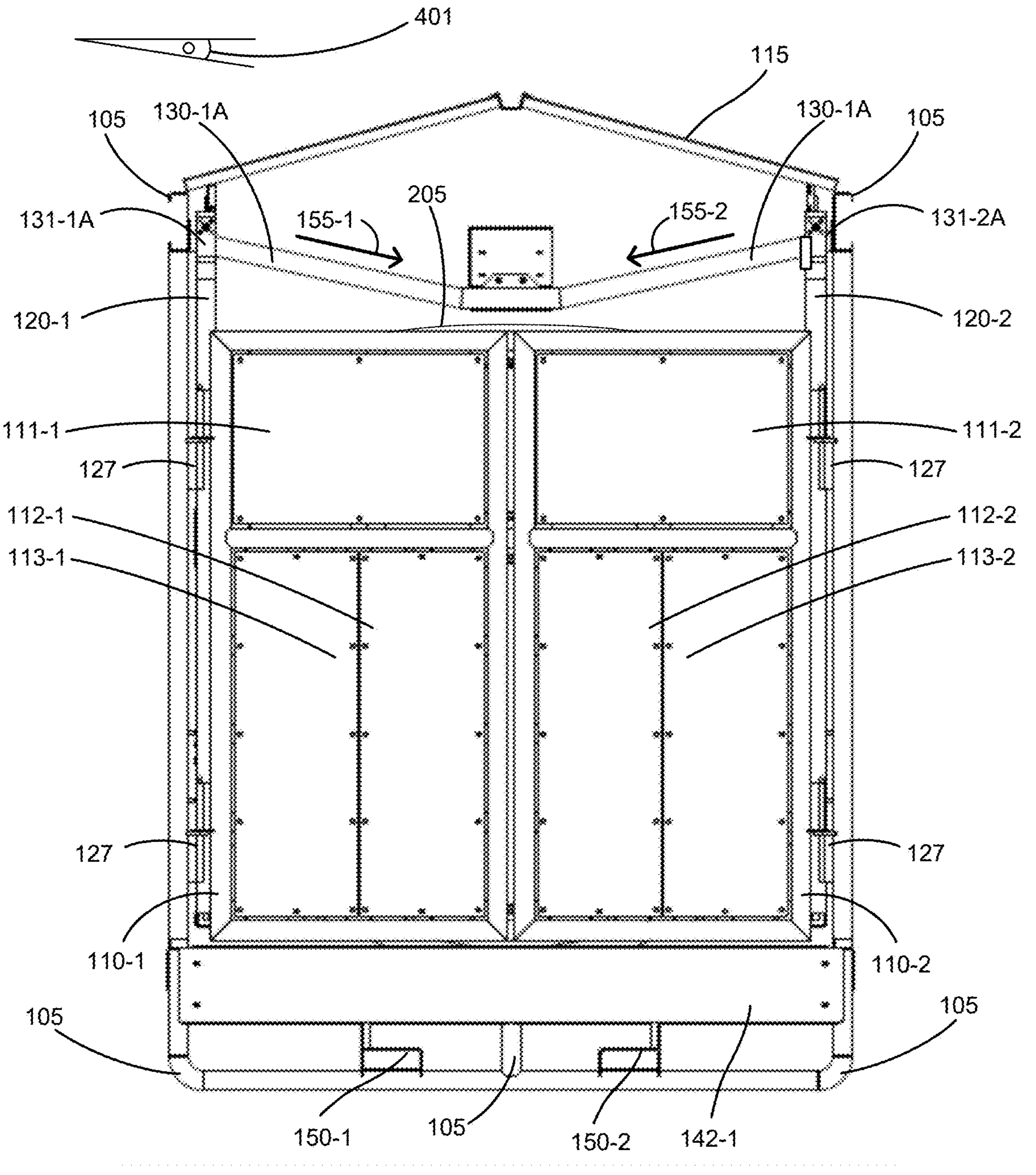
FIG. 4 depicts a right-side elevational view of the equine slow-feeder of FIG. 1 with closed loading doors and in a loaded state with hay loaded inside, according to various embodiments.

FIG. 4 depicts a right-side elevational view of the equine slow-feeder 100 of FIG. 1 with closed loading doors 110 and in a loaded state with hay 205 loaded inside, according to various embodiments. FIG. 4 also illustrates the downward angle 401 of trolley track 130-1A, with respect to horizontal, as it moves inward. The angle of downward slope of downward angle 401 may be between 5 degrees and 50 degrees from horizontal, in various embodiments. In some embodiments, the angle 401 of downward slope is between about 15 degrees and 30 degrees from horizontal. In some embodiments, the angle 401 of downward slope is between about 20 degrees and about 35 degrees from horizontal.

Figure 5:
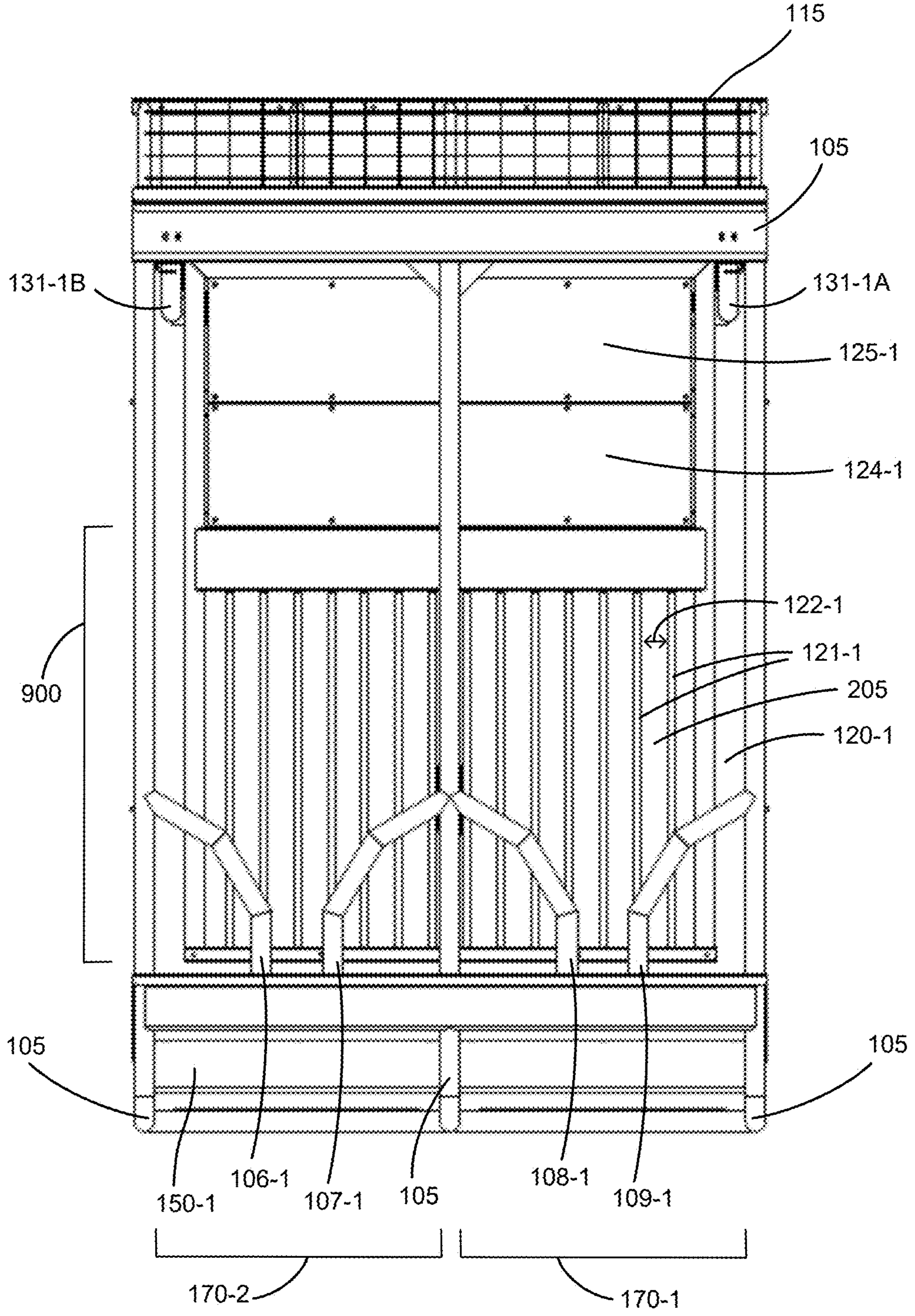
FIG. 5 depicts a front elevational view of the equine slow-feeder of FIG. 1 with closed loading doors and in a loaded state with hay loaded inside, according to various embodiments.

FIG. 5 depicts a front-side elevational view of the equine slow-feeder 100 of FIG. 1 with closed loading doors 110 and in a loaded state with hay 205 loaded inside, according to various embodiments. A feeding space 122-1, is a narrow space between adjacent grid elements 121 through which the mouth of an equine animal, such as horse 200, can grasp small bites of hay 205 is visible between spaced apart grid elements 121-1. In some embodiments, a feeding space 122 may be between 1 inch and 3 inches in width. In some embodiments, a feeding space may be between about 1 inch and 6 inches. In some embodiments, the feeding space provided by the spacing between adjacent grid elements 121-1 is user adjustable. A plurality of similar spaced feeding spaces 122 for equine animals to access hay 205 are presented between others of the adjacent grid elements 121-1 of grid panel 120-1. Although even spacing of feeding spaces 122 is illustrated, the feeding spaces may be irregular in spacing, in some embodiments. FIG. 5 also depicts additional frame elements 106-1, 107-1, 108-1, and 109-1 which have been included to form feeding stalls 170-1 and 170-2. For example, additional frame elements 106-1, 107-1 are arc shaped or in the shape of a segmented arc and couple with adjacent vertical elements of frame 105 to form the shape of feeding stall 107-1. Similarly, additional frame elements 108-1, 109-1 are arc shaped or in the shape of a segmented arc and couple with adjacent vertical elements of frame 105 to form the shape of feeding stall 107-2.

FIG. 5 also illustrates an adjustable grid element holder 900, which is a lower portion of feed-through grid panel 120 that holds and facilitates adjustably spacing grid elements 121 in the feed-through grid panel 120; and is illustrated in greater detail in FIGS. 9A-9D.

Figure 6:
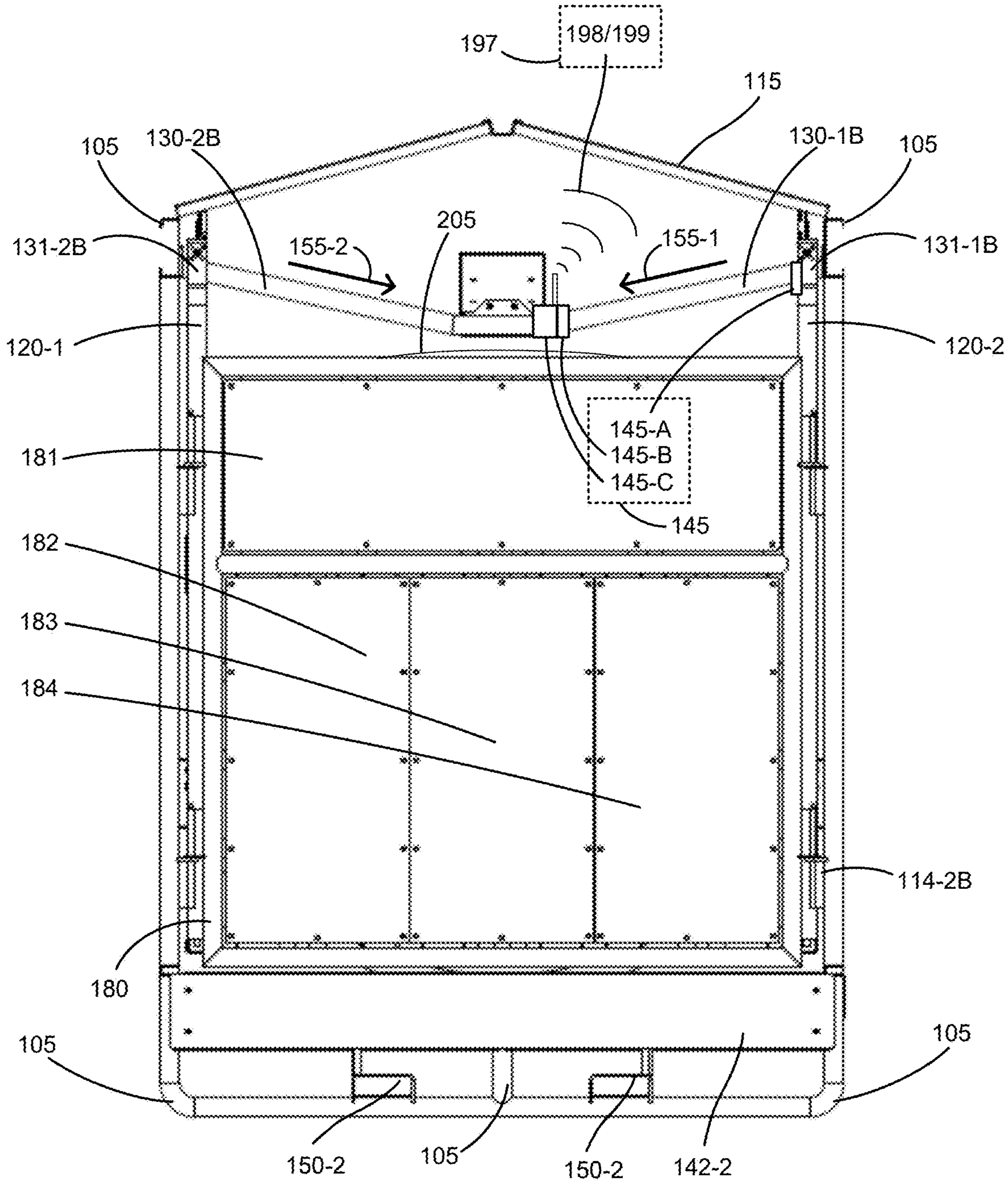
FIG. 6 depicts a left-side elevational view of the equine slow-feeder of FIG. 1 with in a loaded state with hay loaded inside, according to various embodiments.

FIG. 6 depicts a left-side elevational view of the equine slow-feeder 100 of FIG. 1 with in a loaded state with hay 205 loaded inside, according to various embodiments. As depicted, a solid panel 180 is mounted to frame 105 such as by knuckle and pin connectors. Like doors 110, panel 180 may be made fully of a solid material or include solid panels (e.g., 181, 182, 183, and 184) which prevent feed-through access by equine animals on this left side of the equine slow-feeder 100 to encourage the equine animals to access hay 205 via spaces between grid elements 121 in feed-through grid panels 120-1 and 120-2.

One or more low hay sensors 145, when included, may be configured to provide a wired or wireless notification in response to hay contained in the internal cavity 103 reaching a predetermined level associated with being "low" and needing to be refilled either immediately or within a predetermined period of time (such as within 12 hours, 24 hours, or some other time). For example, in some embodiments, a low hay sensor 145 may be a cellular device coupled with a switch which is actuated by being compressed by a trolley wheel assembly 131 when a grid panel 120 rolls inwardly on its respective trolley tracks 130 to a predefined location associated with enough hay 205 having been eaten that a low hay notification is triggered to alert that a refill of hay is needed soon. In some embodiments, a low hay sensor 145 may be a wireless contact sensor, magnetic sensor, hall effect sensor, wired contact sensor or the like which is coupled with a wireless communication module (e.g., with a transmitter or transceiver which communicates over cellular, a Wi-Fi, or other wireless network) to wirelessly report actuation being occurring, a status change of actuation vs not actuated (or vice-a-versa), and or to report current status of the low hay sensor 145 (i.e., actuated or not actuated) on a recurring basis or in response to polling. In some embodiments, a low hay sensor 145 may be a photo sensor or optical camera coupled with a wireless communication module (e.g., a cellular device, Wi-Fi transceiver, etc.), and which is configured to send a photo of the contained hay bale 205 at recurring intervals, at a particular time, and/or in response to being triggered such as by a contact switch on/near the trolley tracks 130. In some embodiments, a low hay sensor 145 may be a proximity/ranging sensor (such as an optical or ultrasonic sensor) coupled with wireless communication module and downwardly facing from roof 115 into cavity 103, and which is configured to send a measurement of the distance from the sensor to the hay bale 205 at recurring intervals, at a particular time, and/or in response to the distance exceeding a preestablished threshold (e.g., 5 feet or 7 feet) which is associated with hay being low enough to need imminent replenishment (otherwise known as a "replenishment threshold") within a short estimated time period (e.g., 12 hours, 24 hours, 36 hours or other selected time period). In some embodiments, a particular message may be sent by the low hay sensor 145, such as a text message to a pre-programmed cellular phone number or an email message to a pre-programmed email address, and/or a message that is viewable in a paired application resident on a cellular phone or other computing device. An example of such a message is, "The hay in slow-feeder number 5 reached a low level at 4:11 P.M. on Wednesday, Jun. 19, 2024, and should be replaced within 12 hours." Another example of such a message is, "EZ-Grazer low hay notification."

In some embodiments, the sensor portion and wireless communication module may be separate components which are communicatively coupled. In other embodiments, as illustrated, the sensor component and wireless communication module may be combined into a single device. A non-limiting example of a wireless contact sensor with a direct/built-in cellular connection that may be used as a low hay sensor 145 is the Flex Aware wireless contact sensor sold by All Aware, LLC of Lawrence, Kansas.

With further reference to FIG. 6, one example of a low hay sensor 145 is illustrated which has two separate portions: the first portion is a magnetic actuator 145-A (e.g., a magnet); and the second portion includes a battery powered magnetic sensor 145-B (e.g., a Hall effect sensor) and a battery powered cellular transceiver 145-C which are communicatively coupled. When the magnetic sensor 145-B and the magnetic actuator 145-A are in close proximity, such as separated by a couple of millimeters, the magnetic sensor 145-B is actuated and causes the cellular transceiver 145-C to transmit a low hay notification 199 to a designated device either once or at designated intervals (e.g., once per hour, once per day). When magnetic actuator 145-A and magnetic sensor 145-B are farther apart such that the magnetic sensor 145-B is not actuated, either no notification is transmitted by the cellular transceiver 145-C or else the cellular transceiver 145-C transmits a "hay not low notification" 198 in the form of a wireless signal at designated intervals (e.g., once per hour, once per 12 hours, once per day). In the depicted embodiment, low hay sensor 145 is actuated when feed-through grid panel 120-2 rolls inwardly on its trolley tracks 130-1A and 130-1B to a predefined location, associated with a low hay condition, where the magnetic actuator 145-A actuates the magnetic sensor 145-B which has been disposed at the predefined location. The phrase, "associated with a low hay condition," means that magnetic sensor 145-B is placed at a predefined location where it will be actuated when enough hay 205 has been eaten that the hay in slow-feeder 100 should be replenished in the near future (e.g., within 12 hours, within 24 hours, within 36 hours—depending on feed rate and placement of the magnetic sensor 145-B). As described previously, upon actuation, magnetic sensor 145-B causes the cellular transceiver 145-C to transmit a low hay notification 199 as a wireless signal, to be ultimately received by a designated device, either one time upon actuation or at designated intervals (e.g., once per hour, once every 12 hours, once per day) while actuation continues to occur. Together, the hay not low notification 198 and the low hay notification 199 may be referred to as a hay level notifications 197.

Figure 7:
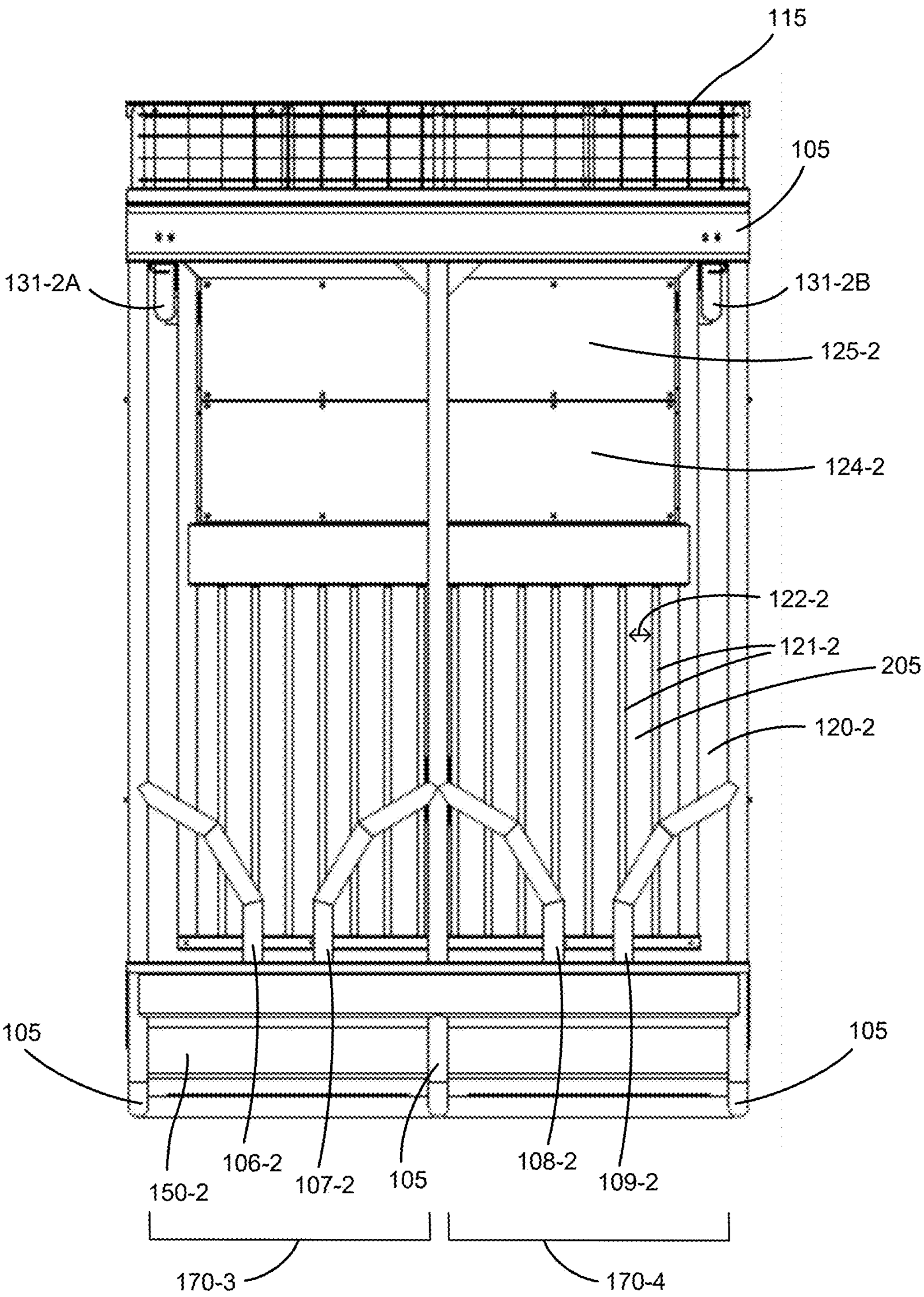
FIG. 7 depicts a rear elevational view of the equine slow-feeder of FIG. 1 with closed loading doors and in a loaded state with hay loaded inside, according to various embodiments.

FIG. 7 depicts a rear elevational view of the equine slow-feeder 100 of FIG. 1 with closed loading doors 110 and in a loaded state with hay 205 loaded inside, according to various embodiments. A feeding space 122-2, is a narrow space through which the mouth of an equine animal, such as horse 200, can grasp small bites of hay 205 is visible between spaced apart grid elements 121-2. In some embodiments, a feeding space 122 may be between 1 and 3 inches in width. Feeding space 122-2 is similar to the previously described feeding space 122-1 and may include similar widths and similar adjustability. A plurality of similar feeding spaces 122-2 for equine animals to access hay 205 are presented between others for the adjacent grid elements 121-2 of grid panel 120-2.

Figure 8:
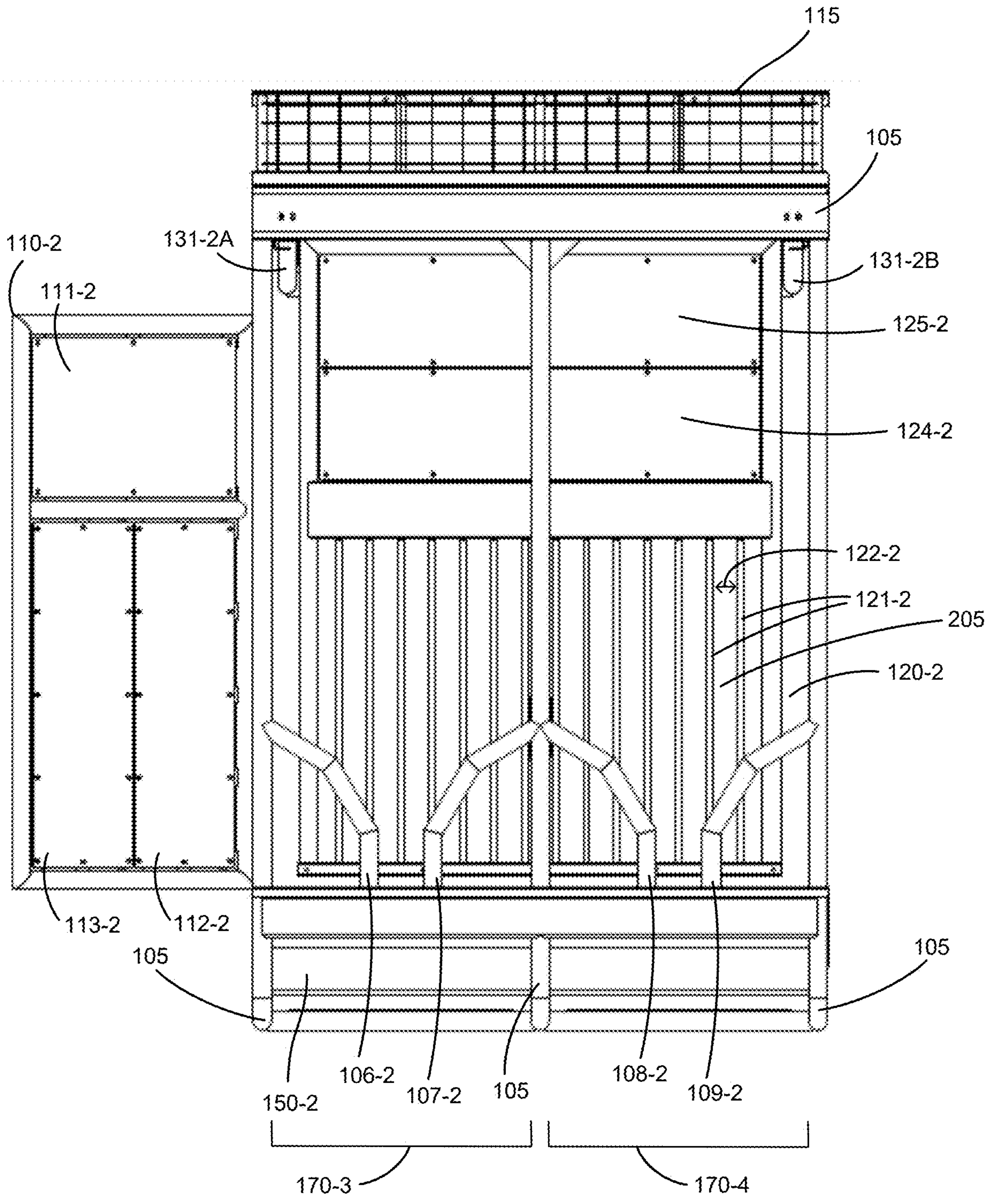
FIG. 8 depicts a rear elevational view of the equine slow-feeder of FIG. 1 with opened loading doors and in a loaded state with hay loaded inside, according to various embodiments.

FIG. 8 depicts a rear elevational view of the equine slow-feeder 100 of FIG. 1 with opened loading doors 110 and in a loaded state with hay 205 loaded inside, according to various embodiments.

Modularity

In some embodiments, slow-feeder 100 is comprised of a variety of modules or components which can be bolted together or otherwise assembled in place. For example, components of external frame 105 may be flat packed for shipping and assembled on site into the cubelike shape that is depicted in FIGS. 1-8. Likewise, doors 110, roof 115, grid panels 120, and panel 180 may be shipped in a flat packed state and assembled/installed on site. This modular nature, as opposed to being either fully assembled and/or having a fully welded-up frame 105, facilitates a lower cube volume for ease of shipping and reduced shipping charges. In some embodiments, the modularity also facilitates user configurability such as by removing grid panels 120 to only have stalls 170 for feed-through access to a hay bale 205, which is elevated off the ground by slow-feeder 100. In some embodiments, as described further below, the hay bale 205 may be netted with a hay net. Additionally, or alternatively, doors 110 and/or panel 180 may be removed from the sides and replaced by panels with stall configurations similar to stalls 170 to facilitate feeding from all four vertical sides of slow-feeder 100.

Adjustable Grid-Elements

Figure 9A:
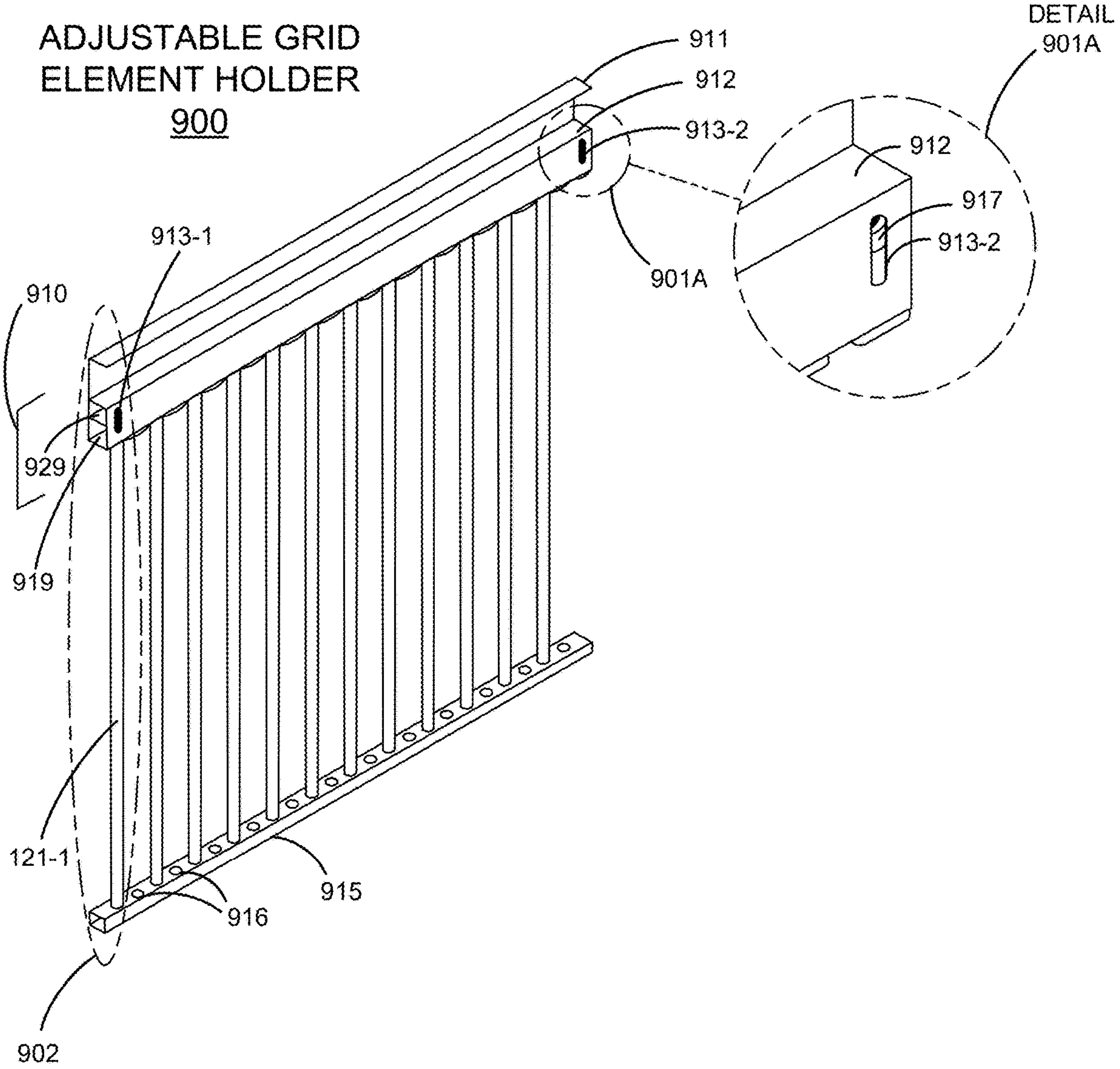
FIG. 9A illustrates a rear perspective view of an example adjustable grid element holder which holds and facilitates adjustably spacing grid elements in a feed-through grid panel and in which the faceplate of the bracket holder is in a lowered position to secure the grid elements, in accordance with various embodiments.

FIG. 9A illustrates a rear perspective view of an example adjustable grid element holder 900 which holds and facilitate adjustably spacing grid elements 121 in a feed-through grid panel 120 and in which the faceplate 912 of the bracket holder 910 is in a lowered position to secure the grid elements 121, in accordance with various embodiments.

Bracket holder 910 comprises a backing plate 911 and a faceplate 912. In FIG. 9A, a bracket holder 910 is illustrated which has a slots 913 (913-1 and 913-2) on each end of removable/movable faceplate 912. The slot 913-2 on the right end is more visible in enlarged detail 901. Each of the slots 913 provides a thru-hole oval opening for a bolt (not shown) which attaches to threads of a threaded nut affixed to a backing plate 911 disposed behind faceplate 912.

Backing plate 911 is configured to be fixedly or removably attached to a grid panel 120. In the illustrated example, round metal pipes are utilized for the grid elements 121-1 and are secured in place by the exterior halves (backing plate 911 and faceplate 912) of bracket holder 910. While the top ends of pipes 121-1 are secured in bracket holder 910, the bottom ends of the pipes used for grid elements 121-1 are seated in linearly space apart holes 916 of bottom stop 915, which itself is configured to be fixedly or removably coupled to a grid panel 120.

Detail 901A illustrates the thru-hole nature of slot 913-2 and is enlarged enough that the threads a threaded nut 917 are visible. As illustrated, faceplate 912 is in a down position in which a bolt can be threaded into threaded nut 917 and used to secure faceplate 912 in the down position which prevents removal and/or adjustment of the spacing of grid elements 121-1.

Figures 2, 9B:
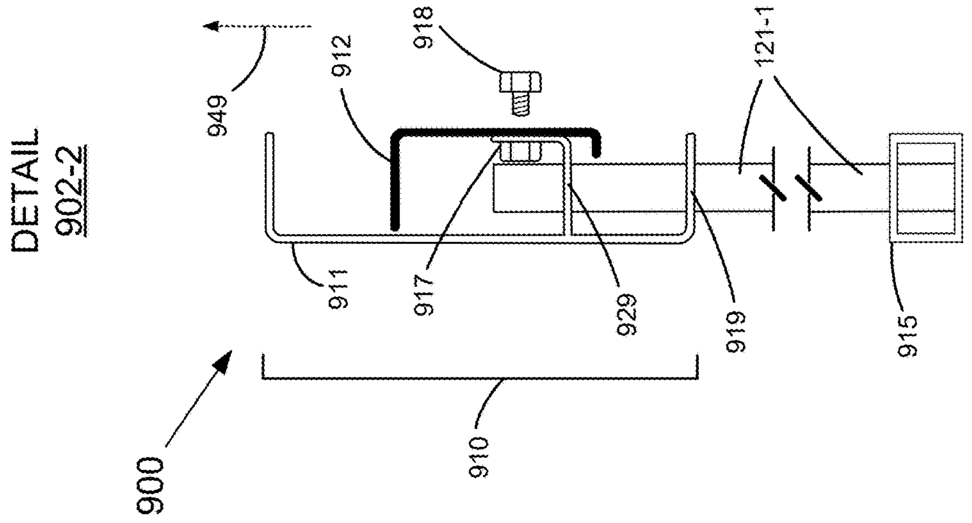
Figures 1, 9B:
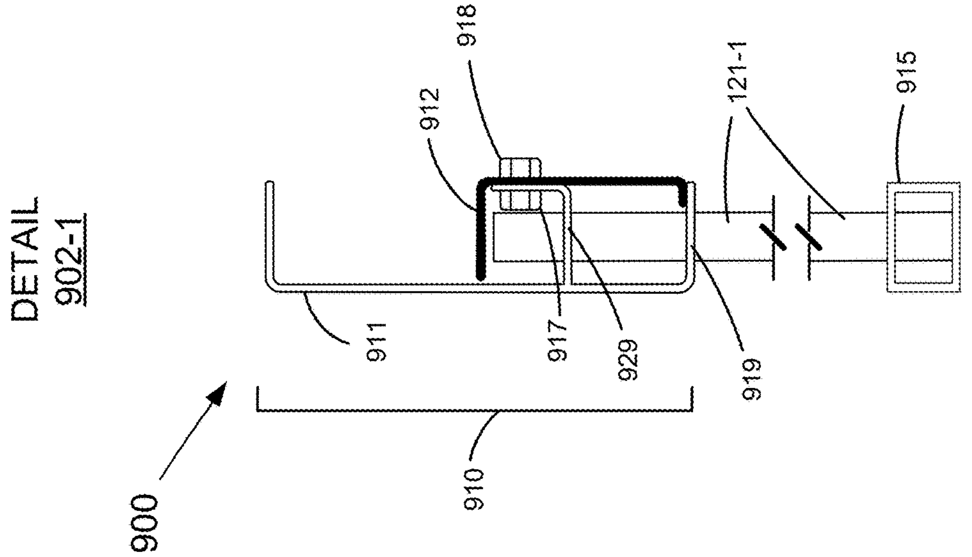

Dashed oval 902 shows the area of a side view detail which is illustrated in FIGS. 9B-1 and 9B-2.

FIGS. 9B-1 and 9B-2 illustrate side detail views 902 of a portion of the adjustable grid element holder 900 of FIG. 9A and depict operation of the faceplate 912 of the bracket holder 910, which is movable to facilitate adjustment of the spacing between grid elements 121, in accordance with various embodiments. From this side view, it can be seen that backing plate 911 has a lower extension 919 into which a plurality of outwardly facing cutouts or slots 914 (visible in detail 903) are formed and an upper extension 919 into which a plurality of inwardly facing cutouts or slots 924 (visible in detail 903) are formed. As depicted, threaded nut 917 is affixed, such as by welding, to a portion of extension 929.

In FIG. 9B-1, detail 902-1 shows faceplate 912 with its securing bolt 918 in place and securing faceplate 912 to threaded nut 917 such that faceplate 912 is held in a downward position which retains and prevents removal and/or adjustment of the spacing of grid elements 121.

In FIG. 9B-2, detail 902-2 shows faceplate 912 with its securing bolt 918 removed such that faceplate 912 can be moved to the upward position (by sliding it in direction 949) that is illustrated, after it is unsecured, which permits removal and/or adjustment of the spacing of the individual grid elements 121. It should be appreciated that securing bolts 918 may simply be loosened, without removing them, in order to unsecure and faceplate 912 so that it can then be slid upward. After grid elements 121 are inserted/removed and/or spacing is adjusted faceplate 912 is moved back to the downward position and securing bolt 918 is resecured to threaded nut 917 so that faceplate 912 becomes secured between threaded nut 917 and the head of bolt 918. It should be appreciated that the securing bolts are bilateral and may both need to be loosened/removed to move faceplate 912 prior to manipulation of grid elements 121, and then both resecured after manipulation and replacement of faceplate 912.

Figure 9C:
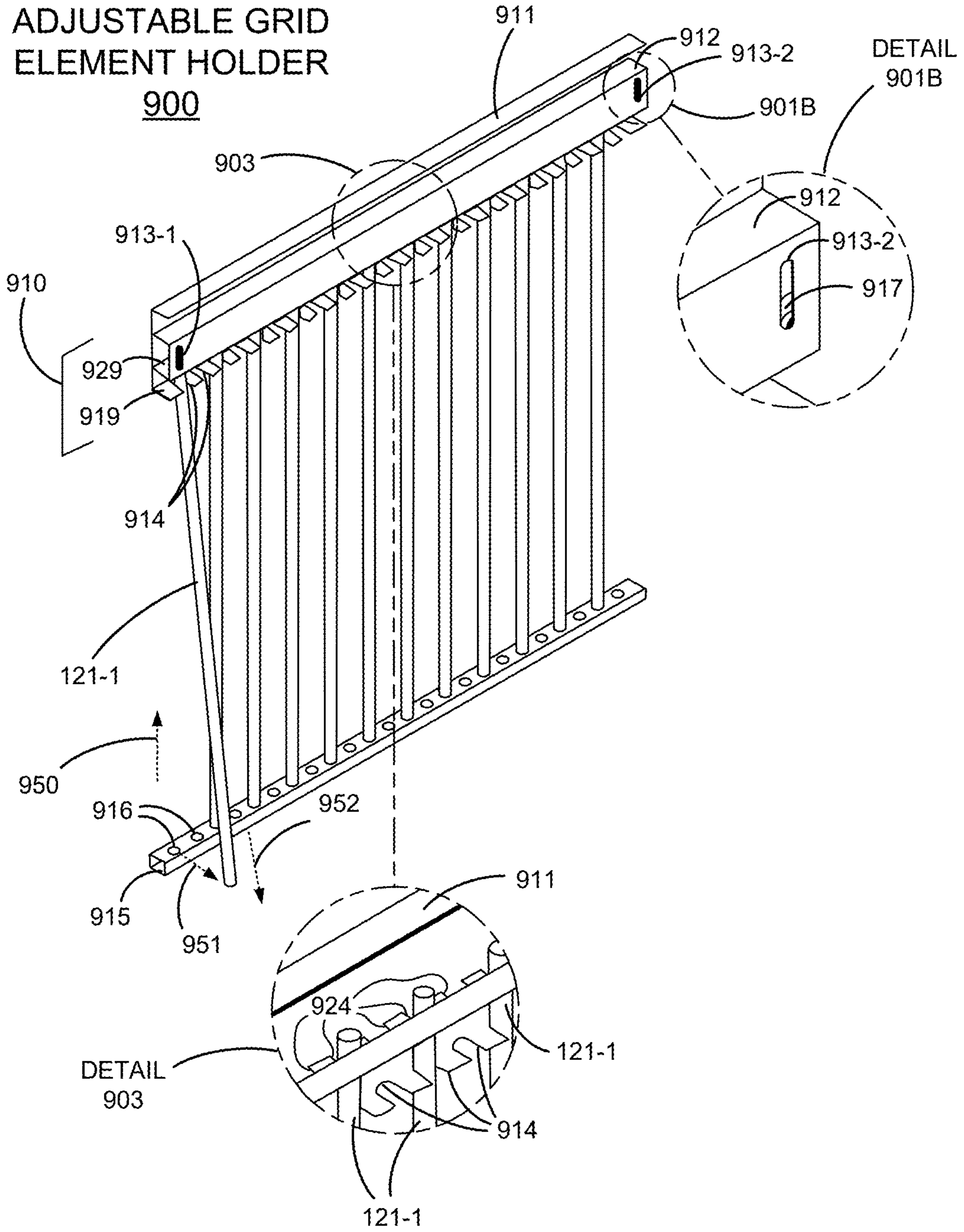
FIG. 9C illustrates a rear perspective view of an example adjustable grid element holder which holds and facilitates adjustably spacing grid elements in a feed-through grid panel and in which the faceplate of the bracket holder is in a raised position to facilitate adjustment of the grid elements, in accordance with various embodiments.

FIG. 9C illustrates a rear perspective view of an example adjustable grid element holder 900 which holds and facilitate adjustably spacing grid elements 121 in a feed-through grid panel 120 and in which the faceplate 912 of the bracket holder 910 is in a raised position to facilitate adjustment of the grid elements 121, in accordance with various embodiments. Left most grid element 121-1 is depicted as being removed for repositioning. Such removal is effected by lifting a grid element upward in direction 950 to remove its bottom portion from its respective hole 916 (in which it is seated) of the spaced apart holes 916, then rocking it in direction 951 to give it clearance of baseplate 915, and finally pulling it downward in direction 952 to free it from bracket holder 910. The process is performed in reverse to insert or reinsert a grid element 121-1.

Detail 901B illustrates the thru-hole nature of slot 913-2 and is enlarged enough that the threads a threaded nut 917 are visible. As illustrated, securing bolt 918 (not pictured) has been removed to free faceplate 912 for movement, and faceplate 912 has been moved to an upward position which permits removal and/or adjustment of the spacing of grid elements 121-1. It should be appreciated that faceplate 912 can be completely removed if the securing nuts through slots 913-1 and 913-2 are completely removed rather than just loosened.

Detail 903 illustrates components of bracket holder 910 which are visible after faceplate 912 is completely removed. To include slots 914 and slots 924 which are opposing slots which form the "bracket" aspect of bracket holder 910 When faceplate 912 is in the downward position and secured in place (enabling the "holder" aspect of bracket holder 910), the opposing slots 914 and 924 work together to together capture the diameter of the pipes used as grid elements 121-1 and securely hold the upper ends of the grid elements 121-1 within bracket holder 910. When faceplate 912 is moved to its upper position or completely removed, the opposing slots are exposed/unconfined and removal of the grid elements 121-1 in the manner previously described is facilitated.

Figure 9D:
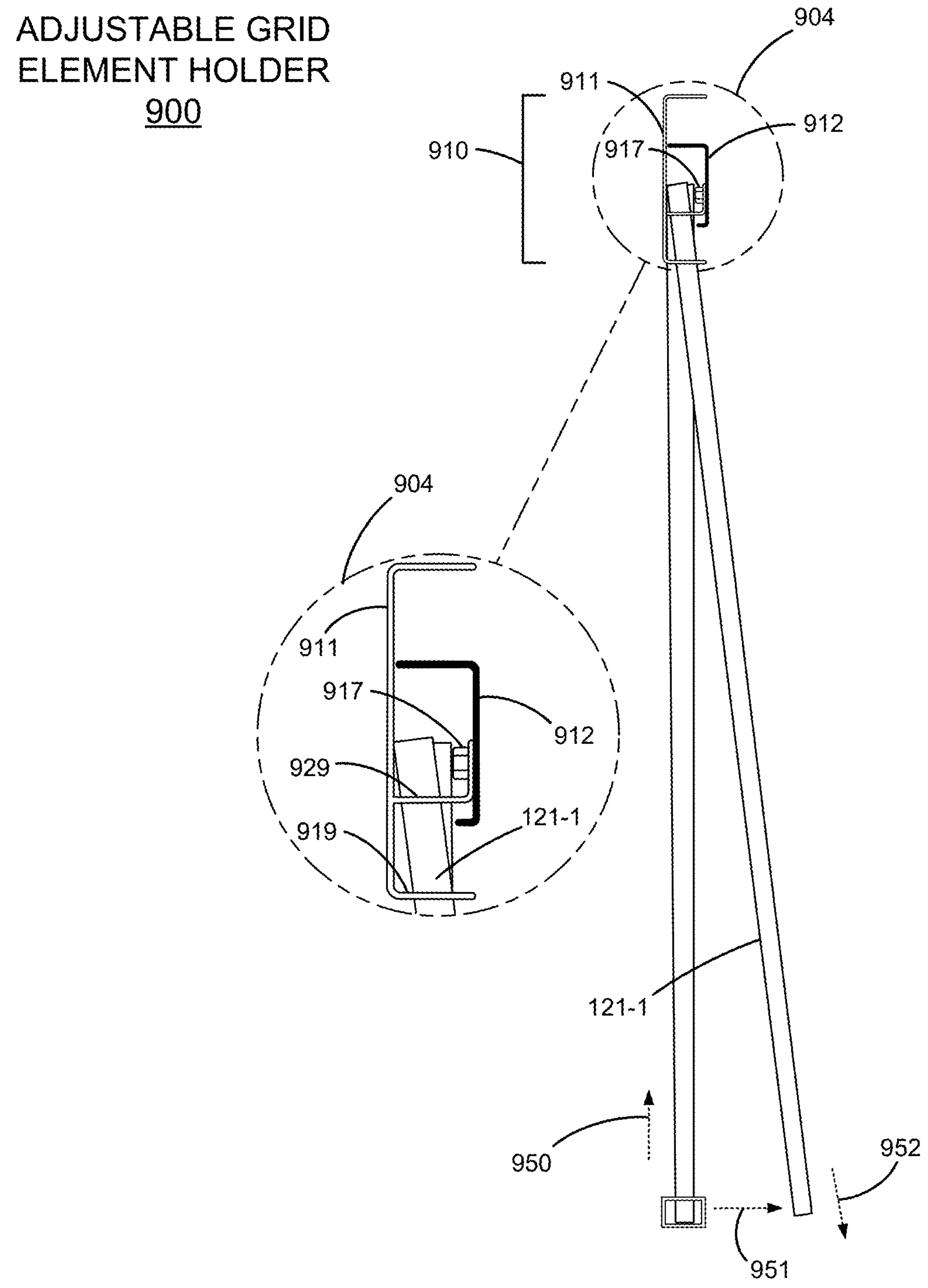
FIG. 9D illustrates a side view of the adjustable grid element holder of FIGS. 9A and 9C which depicts the adjustment of the spacing between grid elements, in accordance with various embodiments.

FIG. 9D illustrates a side view of the adjustable grid element holder 900 of FIGS. 9A and 9C which depicts the adjustment of the spacing between grid elements 121, in accordance with various embodiments. As with FIG. 9C, left most grid element 121-1 is depicted as being removed for repositioning. Such removal is effected by lifting a grid element upward in direction 950 to remove its bottom portion its hole 916 of the spaced apart holes 916, then rocking it in direction 951 to give it clearance of baseplate 915, and finally pulling it downward in direction 952 to free it from the opposing slots 914 and 924 of bracket holder 910. The process is performed in reverse to insert or reinsert a grid element 121-1.

Feed-Through Panel Variation

Figure 10:
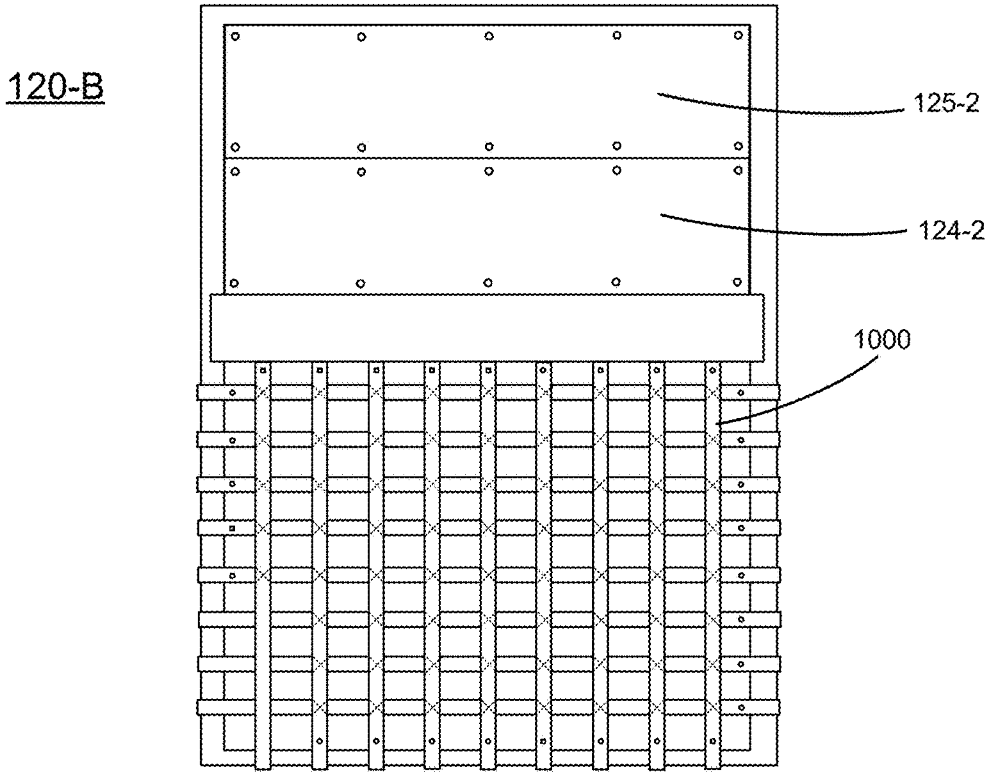
FIG. 10 illustrates an example of an alternate version of a feed-through grid panel in which grid elements have been replaced by a flexible grid net, according to various embodiments.

FIG. 10 illustrates a front view of an example of an alternate version of a feed-through grid panel 120-B in which grid elements have been replaced by a flexible grid net 1000, according to various embodiments. Flexible grid net may be made of various materials such as crossing nylon straps (depicted), nylon string, rope, or the like, and provides defined spaces through which an equine animal can access a bale of hay 205 (not depicted) which is compressed by and disposed behind the flexible grid net. In some embodiments, the defined openings are square, such as 1.75"×1.75" openings or 3"×3" openings. Other sizes of the defined openings and other shapes of defined openings (e.g., rectangular or triangular are possible).

Hay Net

Figure 11:
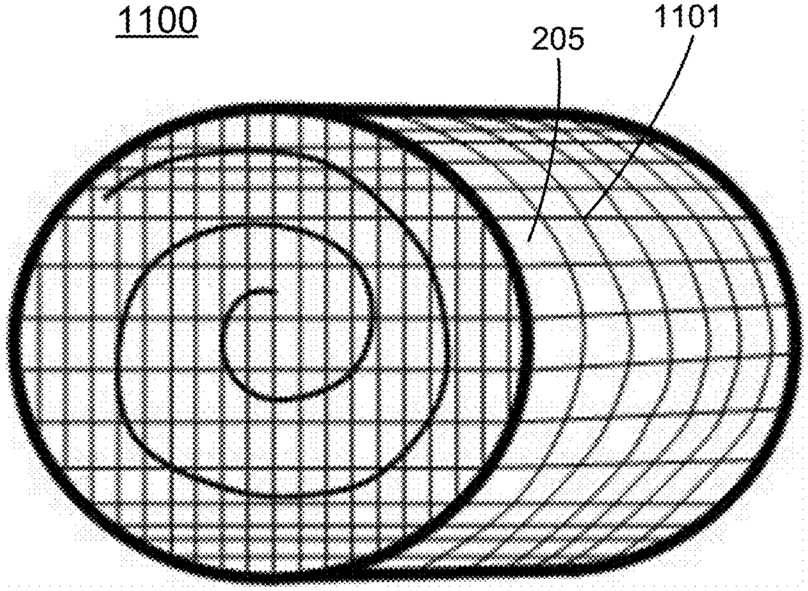
FIG. 11 illustrates a hay bale disposed within a hay net, in accordance with various embodiments.

FIG. 11 illustrates a bale 205 disposed within a hay net 1101 to form a hay-netted bale 1100, in accordance with various embodiments. A "hay net" 1101 is a nylon or polymer net with spaced openings through which an equine animal can feed. A hay net 1101 is similar to a hairnet, except that it is sized to fit over a bale of hay, such as the large round bale 205 which is depicted in FIG. 11, and it is made of more durable material than a hair net. Conventionally, hay nets 1101 are typically placed over a bale of hay which is on the ground and outdoors in a pasture or else smaller bales or loose hay is loaded into a hay net and the loaded hay net is suspended in the air, such as within a horse stall. While hay nets 1101 do confine hay and provide some limits to feeding access, they also have numerous disadvantages associated with their use, including one or more of: 1) being used on hay which is laying on the ground; 2) being used on hay which does not have an environmental cover; 3) wearing out quickly; 4) moving while the animal tries to eat (in the case of a suspended hay net); 5) no compression of hay; 6) inconsistent compression of hay as hay is diminished through feeding; and 7) getting caught on feet, hooves or shoes of animals. However, some or all of these particular disadvantages may be overcome by placing hay net covered bales 1100 inside cavity 103 of a slow-feeder 100 and then compressing the hay-netted bale 1100 behind a feed-through grid panel 120. In such an embodiment, because the hay net 1101 already somewhat limit feeding access to an equine animal, the spacing of grid elements 121 in a feed-through panel 120 may be adjusted to increase the spacing, such as by removing some of the grid elements 121.

In some embodiments, the grid panels 120-1 and 120-2 may be removed from the slow-feeder 100 (or alternatively left in place, but with grid elements 121 removed) and a bale of hay which has been netted within a hay net can then be loaded into cavity 103. In some embodiments, the grid panels 120-1 and 120-2 may be left in place along with grid elements 121 (with suitable adjustment to spacing) and a bale of hay which has been netted within a hay net can then be loaded into cavity 103. The netted hay may be loaded as any other bale would be loaded.

Hay Level Notifications

Figure 12A:
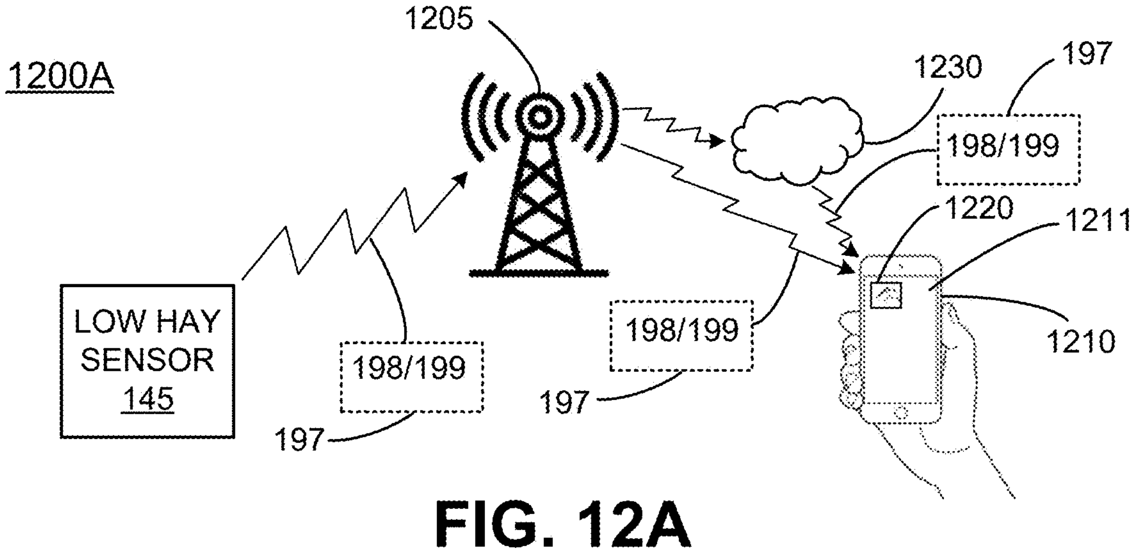
FIGS. 12A-12B illustrate techniques for sending a hay level notification, in accordance with various embodiments.
Figure 12B:
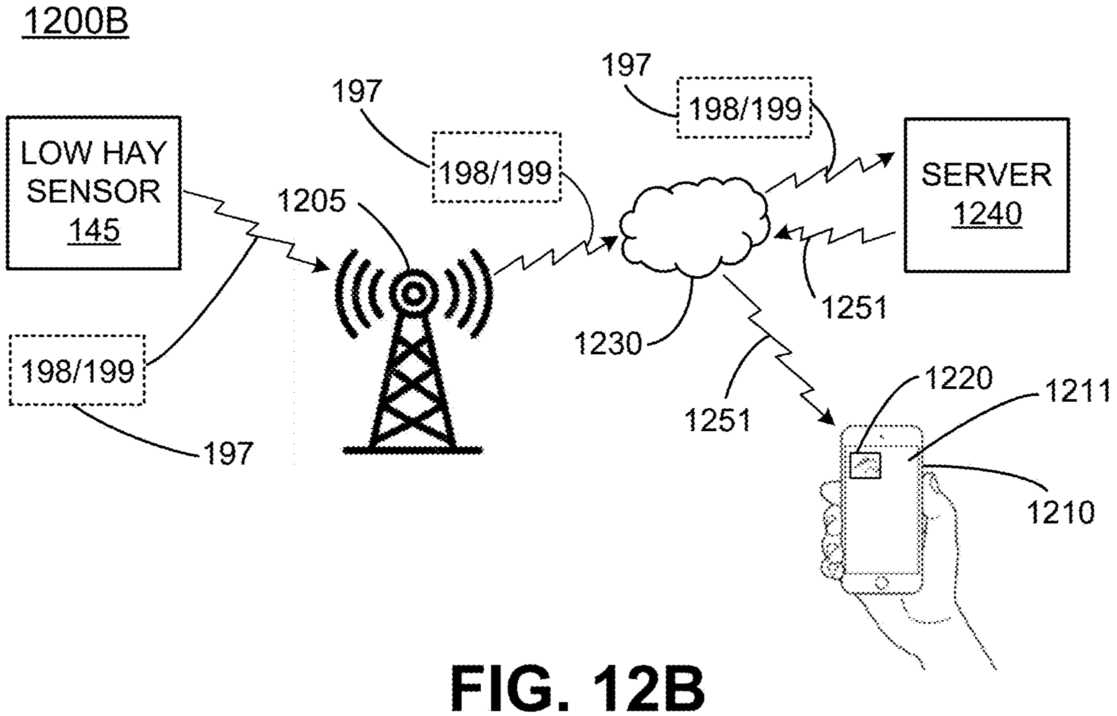

FIGS. 12A-12B illustrate techniques for sending a hay level notifications 197 in accordance with various embodiments. A hay level notification 197 may be a notification that the hay level is low (i.e., a low hay notification 199) or the hay level is not low (i.e., a hay not low notification 198). A low hay notification 197 is sent when a low hay sensor 145 is actuated, due to hay in slow-feeder 100 being near enough to empty that it needs to be replenished in the near future (i.e., within 12 hours, within 24 hours, 36 hours). A hay level not low notification 198 may be sent on recurring intervals when low hay sensor 145 has not been actuated (i.e., once every 6 hours, once every 12 hours, once every 24 hours).

In FIG. 12A low hay sensor 145 is depicted sending a hay level notification 197 as a wireless signal, via a cellular transmission, to a cellular tower 1205 which then sends the signal to designated device 1210 (e.g., a computer, a tablet computer, a smartphone, or the like) or relays the signal through a network 1230 (e.g., the Internet) until it is received at designated device 1210. In FIG. 12A, the designated device 1210 is a handholdable smartphone (e.g., and iPhone or similar smartphone). Content of the hay level notification 197 may be displayed the display 1211 of designated device 1210 in various manners depending upon the format in which it was transmitted. By way of example, and not of limitation, it may be displayed as a text message, as an email message, or as a message in an application 1220 that is installed upon device 1210 (e.g., a paired application that exists to receive and present hay level notifications—where "paired" means that the application works with the low hay sensor 145).

In FIG. 12B low hay sensor 145 sends a hay level notification 197 via a cellular transmission to a cellular tower 1205 which then relays the hay level notification 197 until it is received by server 1240. Server 1240 includes a processor and a memory. Server 1240 may be configured to perform additional formatting of the hay level notification 197, such as: formatting it to be sent/received as a text message, formatting it to be sent/received as an email message, and/or formatting it to be sent to and presented to a user within an application 1220 installed upon the designated device 1210 (e.g., a paired application which works to receive and present hay level notifications). Server 1240 also operates to relay the hay level notification as a formatted hay level notification 1251 through network 1230 to one or more designated devices 1210 (e.g., computers, a tablet computers, smartphones, or the like). In FIG. 12B, a single designated device 1210 is illustrated as a handholdable smartphone (e.g., and iPhone or similar smartphone). The formatted hay level notification 1251 may be displayed on display 1211 in various manners depending upon how it was transmitted. For example, it may be displayed as a text message, as an email message, or as a message in an application 1220 that is installed upon device 1210 (e.g., a paired application that exists to receive and present hay level notifications).

Figure 13A:
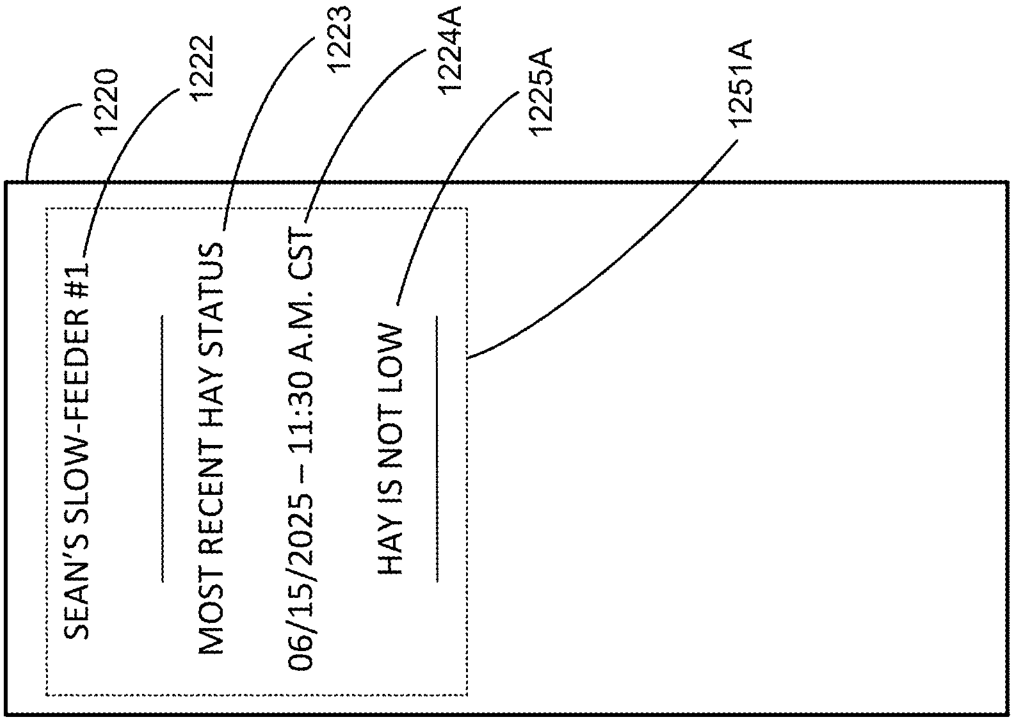
FIGS. 13A-13B illustrate techniques for presenting a hay level notification on a designated device, in accordance with various embodiments.
Figure 13B:
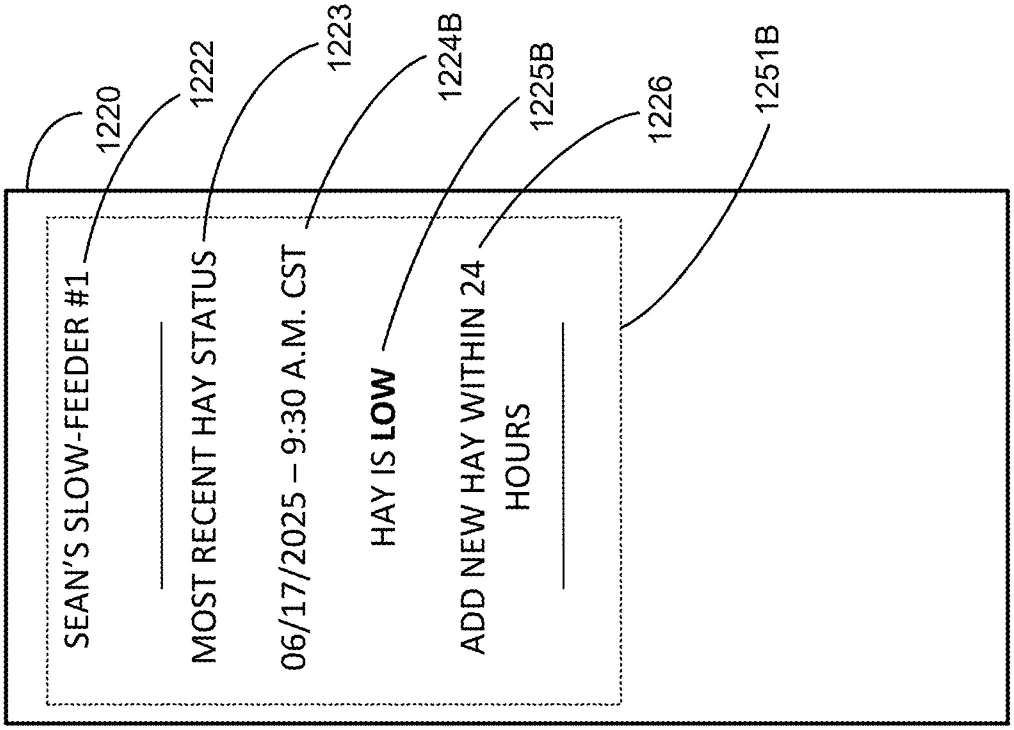

FIGS. 13A-13B illustrate techniques for presenting a formatted hay level notification 1251 on a designated device, in accordance with various embodiments.

FIG. 13A depicts a formatted hay level notification 1251A which results from a hay level not low notification 198 sent from low hay sensor 145. For example, server 1240 may receive the low level not low notification 198 and may format it with user supplied identification information (e.g., a user supplied name for the slow feeder instead of an ID number in the message) and/or a time of transmission or receipt information associated with the hay status in the notification. Formatted hay level notification 1251A is presented as a message within application 1220 and can be accessed, such as by opening the application 1220 on designated device 1210. Formatted hay level notification 1251A provides slow-feeder identification information 1222, such as a name or serial number associated with a slow-feeder to which the notification pertains (e.g., Sean's Slow Feeder #1). In some embodiments, slow-feeder identification information 1222 may be user selectable or preset. In some embodiments, formatted hay level notification 1251A may provide a heading 1223 which generally describes the topic of the message (e.g., "Most Recent Hay Status"). In some embodiments, formatted hay level notification 1251A may provide a time stamp 1224A which describes a time associated with the notification (e.g., "06/15/2025—11:30 A.M. CST"). In some embodiments, formatted hay level notification 1251A may provide information 1225A about the level of the hay in the designated slow feeder 100 (e.g., "HAY IS NOT LOW").

FIG. 13B depicts a formatted hay level notification 1251B which results from a low hay level notification 199 from sensor 145. For example, server 1240 may receive the low hay level notification 199 and may format it with user supplied identification information (e.g., a user supplied name for the slow feeder instead of an ID number in the message), time of transmission or receipt information associated with a hay status in the notification, and/or a window of time for adding new hay. Hay level notification 1251B is presented as a message within application 1220 and can be accessed, such as by opening the application 1220 on designated device 1210. Hay level notification 1251B provides slow-feeder identification information 1222, such as a name or serial number associated with a slow-feeder to which the notification pertains (e.g., Sean's Slow Feeder #1). In some embodiments, slow-feeder identification information 1222 be user selectable or preset. In some embodiments, hay level notification 1251B may provide a heading 1223 which generally describes the topic of the message (e.g., "Most Recent Hay Status"). In some embodiments, hay level notification 1251B may provide a time stamp 1224B which describes a time associated with the notification (e.g., "06/17/2025—9:30 A.M. CST"). In some embodiments, hay level notification 1251B may provide information 1225B about the level of the hay in the designated slow feeder 100 (e.g., "HAY IS LOW"). In some embodiments, hay level notification 1251B may provide information 1226 about the amount of time which remains to refill the hay in slow-feeder 100 before it is estimated to be empty (e.g., "ADD NEW HAY WITHIN 24 HOURS"), and this time may count downward in subsequent formatted hay level notification messages.

Example Method of Slow-Feeding an Equine Animal

FIG. 14 illustrates a flow diagram of an example method 1400 of slow-feeding an equine animal in accordance with various embodiments.

At 1410 of FIG. 14, in some embodiments, a feed-through grid panel 120 is positioned against hay (i.e., bale 205) which is loaded into an internal cavity 103 defined by an external frame 105 of an equine slow-feeder 100, wherein the feed-through grid panel 120 is movably coupled to a set of trolley tracks 130 (e.g., 130-1A and 130-1B) of the equine slow-feeder 100, and wherein the trolley tracks 130 slope at a downward angle into the internal cavity 103.

At 1420 of FIG. 14, in some embodiments, the hay (e.g., hay bale 205) within the internal cavity 103 is continually compressed by the weight of the feed-through grid panel 120 as the feed-through grid panel 120 (e.g., 120-1) rolls inwardly along the trolley tracks 130 (e.g., 130-1A and 130-1B) under the force of gravity as hay (e.g., bale 205) in the internal cavity 103 is diminished by feeding of the equine animal (e.g., equine animal 200). The feed-through grid panel 120 is configured to: limit feeding access to the hay by providing a plurality of narrow feeding spaces (e.g., like feeding space 122-1) defined by grid elements 121 (e.g., grid elements 121-1) of the feed-through grid panel 120; and to also facilitate adjustment of spacing 122 between the grid elements 121 to modify the size of the feeding spaces 122 (e.g., as illustrated in FIGS. 9A-9D). In some embodiments, the feed-through grid panel 120 may be configured to facilitate user adjustment of the weight of the feed-through grid panel 120 such as by incorporating one or more weight-holders 123 into which a user may incorporate weighty objects such as cinder blocks 129 (see e.g., FIG. 1).

At 1430 of FIG. 14, in some embodiments, responsive a low hay sensor 145 being actuated by diminishment of a hay volume (of hay bale 205) within the internal cavity 103 to a predetermined point associated with a replenishment threshold, wirelessly transmit a low hay notification 199 for receipt by a user selected remotely located device (e.g., device 1210). That is, in some embodiments, separated portions of the low hay sensor 145 (one portion fixed to allocation on a trolley track 130, one coupled with a feed-through grid panel 120) are placed such that they only come close enough together to achieve actuation when the feed-through grid panel 120 rolls downhill to a predetermined point where hay volume in the internal cavity of slow-feeder 100 is diminished to a replenishment threshold associated with the hay needing to be replaced/additional hay loaded within the internal cavity 103 of the slow-feeder 100 in a short estimated period of time that may be designated as hours or days (e.g., within 12 hours, within 24 hours, within 48 hours). By remotely located, what is meant is the user selected device may be hundreds of feet way or many miles away (e.g., 2,000 miles away). The low hay notification 199 may be sent to the user selected remotely located device (e.g., device 1210) in the form of a one of: a text message viewable on the remotely located device 1210, an email message viewable on the remotely located device 1210, and a notification to a paired application 1220 on the remotely located device 1210. The low hay notification 199 may be sent directly from the low hay sensor 145 for unaltered receipt at the user device (see FIG. 12A) or it may be received first by a server (e.g., server 1240), formatted, and then ultimately sent from the server as a formatted hay level notification (e.g., 1251B) for receipt by the user selected device (see FIG. 12B). It should be appreciated that the low hay notification may similarly be sent to a plurality of user selected remotely located devices.

At 1440 of FIG. 14, in some embodiments, responsive to a failure by the low hay sensor 145 to detect the hay volume (of hay bale 205) within the internal cavity 103 being diminished to the replenishment threshold (i.e., the absence of low hay detection), wirelessly transmit a hay not low notification 198 for receipt by the user selected remotely located device (e.g., device 1210). The hay not low notification 198 may be sent to the user selected remotely located device (e.g., device 1210) in the form of a one of: a text message viewable on the remotely located device, an email message viewable on the remotely located device, and a notification to a paired application 1220 on the remotely located device. The hay not low notification may be sent directly from the low hay sensor 145 for unaltered receipt at the user device (see FIG. 12A) or it may be received first by a server (e.g., server 1240), formatted, and then ultimately sent from the server as a formatted hay level notification (e.g., 1251A) for receipt by the user selected remotely located device (see FIG. 12B). It should be appreciated that the hay not low notification may similarly be sent to a plurality of user selected remotely located devices. In other embodiments, when the low hay sensor is not actuated, no notification is sent to a user device.

Additional Embodiments

In some embodiments, one or more additional sensors, besides a low hay sensor may be incorporated into slow-feeder 100 to collect additional information about the environment of the slow feeder 100 and/or about the equine animal(s) feeding from slow-feeder 100. This can comprise coupling one or more sensors such as temperature sensors, humidity sensors, microphones, visible imaging devices, and infrared imaging devices to various locations on slow-feeder 100 in order to acquire information about the environment in which an equine animal eating from slow-feeder 100 is located and about the equine animal itself. In some embodiments, this acquired information may be processed locally (e.g., by a computer located at slow-feeder 100) or wirelessly sent to a remote location (e.g., miles away from slow-feeder 100) for processing and/or for viewing by a person such as the owner of the equine animal. In some embodiments, the same cellular transceiver 145-C may be utilized for the wireless transmission of raw or processed data that is collected from these sensors. In other embodiments, one or more additional wireless transceivers, may be used for transmission of raw or processed data collected by these transceivers.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed:

1. An equine slow-feeder comprising:

an external frame;

at least one of an openable door and an openable panel coupled with a first side of the external frame which, when opened, provides access for loading baled hay into an internal cavity defined by the external frame;

a set of trolley tracks coupled to the external frame and spanning a portion of a top of the internal cavity, wherein the set of trolley tracks slope at a downward angle toward a middle of the internal cavity;

a feed-through grid panel disposed on a second side of the external frame and movably coupled with by one or more trolley wheel assemblies to the set of trolley tracks, wherein grid elements of the feed-through grid panel are arranged to define a plurality of narrow feeding spaces which expose portions of the baled hay within the internal cavity, and wherein the feed-through grid panel is configured to:

press against the baled hay in response to a weight of the feed-through grid panel which is compressed against the baled hay by downhill rolling of the feed-through grid panel on the set of trolley tracks which is continually effected by gravity as the baled hay is diminished by feeding of an equine animal; and limit feeding access of the equine animal, to the baled hay within the internal cavity, to the narrow feeding spaces between grid elements of the feed-through grid panel; and a low hay sensor coupled with at least one trolley track of the set of trolley tracks and configured to wirelessly send a notification in response to the feed-through grid panel having moved inward to cause one or more of the trolley wheel assemblies to actuate the low hay sensor disposed at a location along the trolley track, wherein the location has been predetermined to be associated with a volume of the baled hay being diminished to a point requiring loading additional hay into the internal cavity within a predetermined amount of time.

2. The equine slow-feeder of claim 1, further comprising a trough configured to be disposed below the baled hay and to catch portion of hay which is dislodged from the bale of hay during feeding by the equine animal, wherein the trough is configured to slope at the downward angle toward the middle of the internal cavity.

3. The equine slow-feeder of claim 1, wherein the downward angle is an angle between about 15 degrees and about 35 degrees relative to a horizontal plane.

4. The equine slow-feeder of claim 1, wherein the feed-through grid panel comprises a lower portion in which the grid elements are disposed and an upper portion which further comprises a solid sub-panel positioned above the grid elements to prevent feeding access through the upper portion of the feed-through grid panel.

5. The equine slow-feeder of claim 1, wherein the grid elements of the feed-through grid panel are adjustable to vary a width of the feeding spaces between the grid elements.

6. The equine slow-feeder of claim 1, wherein the feed-through grid panel further comprises: a weight-holder configured to receive supplemental weights to increase the compressive force exerted on the baled hay by the feed-through grid panel.

7. The equine slow-feeder of claim 1, wherein the low hay sensor is a magnetically actuated sensor configured to wirelessly transmit the notification to a remote device upon actuation, wherein the remote device is located remotely from the location of the equine slow-feeder.

8. An equine slow-feeder comprising:

an external frame defining an internal cavity configured to receive baled hay for consumption of an equine animal which utilizes the slow-feeder;

at least one of an openable side door and an openable side panel coupled with the external frame which, when opened, provides access for loading the baled hay into the internal cavity;

a set of trolley tracks coupled to the external frame and spanning a portion of a top of the internal cavity, wherein the trolley tracks slope inwardly into the cavity at a downward angle;

a feed-through grid panel movably coupled via one or more trolley wheel assemblies to the trolley tracks, wherein the feed-through grid panel is arranged to provide limited feeding access to the baled hay and includes:

a plurality of grid elements arranged to define a plurality of feeding spaces, between adjacent grid elements of the plurality of grid elements, through which an equine animal may extract strands of hay from the baled hay; and an adjustable grid element holder configured to facilitate varying of the spacing between the adjacent grid elements so as to modify a size of the feeding spaces;

wherein the feed-through grid panel is configured to:

press against the baled hay in the internal cavity in response to a weight of the feed-through grid panel being compressed against the baled hay by a downhill rolling of the feed-through grid panel into the internal cavity on the set of trolley tracks, wherein the downhill rolling is continually effected by gravity as an amount of the baled hay is diminished by feeding of an equine animal; and limit feeding access of the equine animal, to the baled hay within the internal cavity, to the feeding spaces between grid elements of the feed-through grid panel; and a weight-holder affixed to the feed-through grid panel and designed to receive supplemental weights to adjustably increase the compressive force exerted by the feed-through grid panel on the baled hay; and a low hay sensor coupled with the equine slow-feeder and configured to wirelessly transmit a low hay notification upon actuation occurring in response to a hay volume of the baled hay becoming diminished to a point requiring loading additional hay into the internal cavity within a predetermined amount of time.

9. The equine slow-feeder of claim 8, wherein the low hay sensor is configured to trigger transmission of the low hay notification in the form of one of: a text message viewable on a user selected device which is located remotely from a location of the equine slow-feeder, an email message viewable on the user selected device, and a notification to a paired application on the user selected device.

10. The equine slow-feeder of claim 8, wherein the low hay sensor is further configured to wirelessly transmit a hay not low notification responsive to a failure by the low hay sensor to detect the hay volume within the internal cavity being diminished to the point requiring loading additional hay into the internal cavity within the predetermined amount of time.

11. The equine slow-feeder of claim 8, further comprising: a trough disposed below the internal cavity and configured to collect hay dislodged from baled hay during feeding.

12. The equine slow-feeder of claim 11, wherein: the trough slopes inwardly into the cavity at an angle similar to the downward angle to maintain a consistent gap between the feed-through grid panel and the trough during inward movement of the feed-through grid panel.

13. The equine slow-feeder of claim 8, wherein the downward angle is an angle between about 15 degrees and about 35 degrees relative to a horizontal plane.

14. The equine slow-feeder of claim 8, wherein the adjustable grid element holder is configured to provide feeding spaces having widths ranging from about 1 inch to about 3 inches.

15. The equine slow-feeder of claim 8, wherein the weight-holder is configured to receive and hold one or more supplemental weights selected from the group consisting of: commercially standard size concrete blocks and commercially standard size cinder blocks.

16. A method of slow-feeding an equine animal, the method comprising:

positioning a feed-through grid panel against hay which is loaded into an internal cavity defined by an external frame of an equine slow-feeder, wherein the feed-through grid panel is movably coupled to a set of trolley tracks of the equine slow-feeder, and wherein the trolley tracks slope at a downward angle into the internal cavity;

continually compressing the hay within the internal cavity by a weight of the feed-through grid panel as the feed-through grid panel rolls inwardly along the trolley tracks under the force of gravity as hay in the internal cavity is diminished by feeding of the equine animal, wherein the feed-through grid panel is configured to:

limit feeding access to the hay by providing a plurality of narrow feeding spaces defined by grid elements of the feed-through grid panel; and facilitate adjustment of spacing between the grid elements to modify a size of the feeding spaces; and responsive to a low hay sensor being actuated by diminishment of a hay volume of the hay in the internal cavity to a predetermined point associated with a replenishment threshold, wirelessly transmitting a low hay notification for receipt by a user selected remotely located device.

17. The method as recited in claim 16, further comprising: responsive to a failure by the low hay sensor to detect the hay volume within the internal cavity being diminished to the replenishment threshold, wirelessly transmit a hay not low notification for receipt by the user selected remotely located device.

18. The method as recited in claim 16, wirelessly transmitting a low hay notification for receipt by a user selected remotely located device comprises: sending the low hay notification to the user selected remotely located device in the form of one of: a text message, an email, and a notification to a paired application on the user selected remotely located device.

19. The method as recited in claim 16, wherein the feed-through grid panel is further configured to: facilitate user adjustment of a weight of the feed-through grid panel.

* * * * *